(12) United States Patent
Rajasekaran et al.

(10) Patent No.: US 7,484,092 B2
(45) Date of Patent: Jan. 27, 2009

(54) TECHNIQUES FOR SEARCHING ENCRYPTED FILES

(75) Inventors: Sanguthevar Rajasekaran, Los Altos, CA (US); Rammohan Varadarajan, Cupertino, CA (US)

(73) Assignee: Arcot Systems, Inc., Santa Clara, CA (US)

( * ) Notice: Subject to any disclaimer, the term of this patent is extended or adjusted under 35 U.S.C. 154(b) by 661 days.

(21) Appl. No.: 10/096,086

(22) Filed: Mar. 11, 2002

(65) Prior Publication Data

US 2002/0174355 A1 Nov. 21, 2002

Related U.S. Application Data

(60) Provisional application No. 60/275,207, filed on Mar. 12, 2001.

(51) Int. Cl.
*H04L 9/00* (2006.01)
*G06F 17/30* (2006.01)

(52) U.S. Cl. ............... 713/165; 726/26; 707/3
(58) Field of Classification Search ............ 713/165
See application file for complete search history.

(56) References Cited

U.S. PATENT DOCUMENTS

| | | | |
|---|---|---|---|
| 5,202,986 A | 4/1993 | Nickel | |
| 5,265,065 A * | 11/1993 | Turtle | 707/4 |
| 5,550,976 A * | 8/1996 | Henderson et al. | 709/201 |
| 5,855,018 A * | 12/1998 | Chor et al. | 707/9 |
| 5,953,723 A * | 9/1999 | Linoff et al. | 707/102 |
| 6,055,526 A * | 4/2000 | Ambroziak | 707/2 |
| 6,105,021 A * | 8/2000 | Berstis | 707/3 |
| 6,131,092 A | 10/2000 | Masand | |
| 6,182,069 B1 | 1/2001 | Niblack et al. | |
| 6,230,154 B1 | 5/2001 | Raz et al. | |
| 6,353,823 B1 | 3/2002 | Kumar | |
| 6,363,488 B1 | 3/2002 | Ginter et al. | |
| 6,389,412 B1 | 5/2002 | Light | |
| 6,427,140 B1 | 7/2002 | Ginter et al. | |
| 6,614,789 B1 | 9/2003 | Yazdani et al. | |
| 6,622,248 B1 * | 9/2003 | Hirai | 713/193 |
| 6,785,810 B1 * | 8/2004 | Lirov et al. | 713/165 |
| 7,069,227 B1 * | 6/2006 | Lintel et al. | 705/4 |
| 7,395,437 B2 * | 7/2008 | Agrawal et al. | 713/193 |
| 2001/0007975 A1 * | 7/2001 | Nyberg et al. | 705/1 |

(Continued)

OTHER PUBLICATIONS

Definitions for hash and hash search, Microsoft Press Computer Dictionary, 3rd ed., 1997.*

(Continued)

*Primary Examiner*—Matthew Smithers
*Assistant Examiner*—Jeffery Williams
(74) *Attorney, Agent, or Firm*—Townsend and Townsend and Crew LLP

(57) ABSTRACT

Techniques for efficiently searching encrypted searchable spaces. For example, embodiments of the present invention provide techniques for searching a plurality of files that are stored in encrypted (or ciphertext) form. According to embodiments of the present invention, the search can usually be performed by decrypting only a portion of the encrypted searchable space. According to an embodiment of the present invention, the search techniques determine a set of files comprising one or more files from the plurality of encrypted files that contain a user-specified query element. The set of files is usually determined by decrypting only a subset of the plurality of encrypted files.

43 Claims, 10 Drawing Sheets

U.S. PATENT DOCUMENTS

| | | | |
|---|---|---|---|
| 2001/0019614 A1* | 9/2001 | Madoukh | 380/277 |
| 2002/0069194 A1* | 6/2002 | Robbins | 707/3 |
| 2002/0082901 A1* | 6/2002 | Dunning et al. | 705/10 |
| 2002/0103809 A1 | 8/2002 | Starzl et al. | |
| 2003/0229537 A1* | 12/2003 | Dunning et al. | 705/10 |
| 2005/0147246 A1* | 7/2005 | Agrawal et al. | 380/44 |
| 2007/0255698 A1* | 11/2007 | Kaminaga et al. | 707/3 |
| 2008/0059404 A1* | 3/2008 | Jonker et al. | 707/2 |

OTHER PUBLICATIONS

Dawn Xiaoding Song; Wagner, D.; Perrig, A., "Practical techniques for searches on encrypted data," Security and Privacy, 2000. S&P 2000. Proceedings. 2000 IEEE Symposium on , vol., No.pp. 44-55, 2000.*

Hamrick, Matthew S., "On Using Encryption Technology with Databases", 2001, pp. 1-7.*

Josep Domingo i Ferrer, "Privacy Homomorphisms For Subcontracting Statistical Computation", 1996, citeseer.ist.psu.edu/302962.html.*

Denning, D. E. 1980. Secure statistical databases with random sample queries. ACM Trans. Database Syst. 5, 3 (Sep. 1980), 291-315. DOI= http://doi.acm.org/10.1145/320613.320616.*

Dietzfelbinger et al., "Polynomial hash functions are reliable," *Proc. ICALP 1992*, pp. 235-246.

Faloutsos, C., "Access methods for text," *ACM Computing Surveys*, 17(1):49-74 (1985).

Gonnet et al., *Handbook of Algorithms and Data Structures*, pp. 130-133, Addison-Wesley, Reading, MA (1991).

Horwitz et al., *Computer Algorithms*, pp. 131-137, W. H. Freeman Press (1998).

Manber et al., "GLIMPSE: A tool to search through entire file systems," Technical Report 93-94, Department of Computer Science, The University of Arizona, Tucson, Oct. 1993.

Knuth, D. E., *The Art of Computer Programming volume 3: Sorting and Searching*, pp. 481-485, Addison-Wesley Publishers (1976).

Oracle Internet Filesystem (iFS) FAQ, downloaded from http://www.orafaq.com/faqifs.htm on Dec. 20, 2004.

Perl et al., "Interpolation Search—A Log Log$N$ Search," *Communications of the ACM*, 21(7):550-553 (1978).

Van Emde Boas et al., "Design and Implementation of an Efficient Priority Queue," *Mathematical Systems Theory*, 10:99-127 (1977).

Wu et al., "Agrep—a fast approximate pattern-matching tool," *Proc. Usenix Winter 1992 Technical Conference*, pp. 153-162 held in San Francisco Jan. 1992.

Wu et al., "Fast Text Searching Allowing Errors," *Communications of the ACM*, 35:83-91 (1992).

* cited by examiner

| Entity | File(s) |
|---|---|
| Entity #1 | a.doc |
| Entity #2 | a.doc, b.doc |
| Entity #3 | b.doc, c.doc, d.doc |

TECHNIQUES FOR SEARCHING ENCRYPTED FILES

CROSS-REFERENCES TO RELATED APPLICATIONS

The present application claims priority from and is a nonprovisional application of U.S. Provisional Application No. 60/275,207, entitled "TECHNIQUES FOR SEARCHING ENCRYPTED FILE SYSTEMS" filed Mar. 12, 2001, the entire contents of which are herein incorporated by reference for all purposes.

BACKGROUND OF THE INVENTION

The present invention relates to techniques for searching files and more particularly to techniques for searching encrypted files.

Searching is an important and extensively used operation in computer applications. For example, a plurality of files stored on a file server may be searched to determine a set of files that contain a particular user-specified word, a list of uniform resource identifiers (URIs) may be searched to determine if a user-specified URI is in the list, a list of available resources may be searched by an access control application to locate a resource and to determine access rights associated with the resource, a particular file's contents may be searched to determine if a particular keyword is included in the file contents, and several other applications.

There are a number of different approaches to searching. According to one approach, searching can be modeled as follows: given a searchable space S comprising elements from some domain $\Sigma$, and given a target or query element k from domain $\Sigma$ (i.e., $k \in \Sigma$), searching is a process that determines if target element k is included in searchable space S (i.e., if $k \in S$). In addition to determining whether or not searchable space S includes query element k, the search process may also identify one or more locations within the searchable space where the query element is found. Domain $\Sigma$ can be any arbitrary domain, e.g., the set of integers, the set of real numbers, a set of strings of alphanumeric characters, etc. Searchable space S might manifest itself in various forms, for example, set S might be a file, a plurality of files from one or more file systems, a list of URIs, a list of resources, etc. Search techniques typically attempt to minimize the time and processing resources needed to determine if $k \in S$.

Given a searchable space comprising a plurality of files, a common search request involves determining all files in the plurality of files that contain a particular query element k. Query element k may be a string comprising one or more words from a particular domain $\Sigma$. Several search techniques have been developed to service such a search request. According to one technique, each file in the plurality of files is sequentially searched to determine occurrences of the query string k in the file's contents. Information identifying files that contain at least one occurrence of the query element is then output in response to the search request. According to another technique, an inverted index may be generated for the plurality of files to be searched. The inverted index is then used to determine files that contain the query element. According to yet another technique, signature files that employ hashing techniques may be used to process the search request. Several other techniques may also be used to process the search request.

The various search techniques described above for processing the search request all presume that the searchable space (e.g., the plurality of files) are not encrypted (i.e., the text files and documents are in readable, known formats). As used herein and in the literature, the term "plaintext" refers to data that is not encrypted (the opposite of being "ciphertext" or data that is encrypted). There are several instances where the searchable space is ciphertext and the presumption does not hold true. For example, data of a sensitive or confidential nature (e.g., credit card information, bank account information, etc.) is usually stored in files that are stored in encrypted form. Conventional search techniques, which are tailored for searching plaintext files, generally cannot be efficiently (in terms of computation time and resources required for the search operation) used for searching encrypted files or ciphertext.

One sector for example that has seen a heightened demand for efficient search techniques that are capable of searching encrypted files is the area of electronic commerce activities. Information of a sensitive and confidential nature, such as credit card information, bank account information, or the like, is generally used for processing online transactions. Due to the "openness" of the Internet, this information used for processing online transactions is generally stored in encrypted form to preserve the privacy of the users and confidentiality of the information. As a result, in order to be able to respond to customer requests in a timely manner, merchants and other entities that engage in online commercial transactions need to use fast and efficient search techniques that are capable of searching encrypted or ciphertext files. In order to be cost effective, the online merchants prefer to use search techniques that require reduced memory and computing resources to perform the searches so as to minimize costs associated with the searches. For example, online banking institutions and credit card companies who authorize payments for online commerce activities need to use efficient search techniques that can process consumer requests in a timely manner while minimizing costs associated with the searches.

In light of the above, there is a need for search techniques that can search encrypted searchable spaces (e.g., encrypted files) in an efficient manner while minimizing the memory and computing resources required to perform the searches.

BRIEF SUMMARY OF THE INVENTION

Embodiments of the present invention provide techniques for efficiently searching encrypted searchable spaces. For example, embodiments of the present invention provide techniques for searching a plurality of files that are stored in encrypted (or ciphertext) form. According to embodiments of the present invention, the search can be performed by decrypting only a portion of the encrypted searchable space. According to an embodiment of the present invention, the search techniques determine a set of files comprising one or more files from the plurality of encrypted files that contain a user-specified query element. The set of files is usually determined by decrypting only a subset of the plurality of encrypted files.

According to an embodiment of the present invention, techniques are provided for searching a plurality of encrypted files for which a data structure storing information related to contents of the plurality of encrypted files is provided. In this embodiment, a computer system configured to perform search the encrypted files receives information identifying a query element. A first set of files is determined from the plurality of encrypted files wherein membership of the first set is based upon the query element and information in the data structure, the first set of files comprising less than all of the plurality of encrypted files. Each file in the first set of files is decrypted and each decrypted file in the first set of files is searched to identify a second set of files that contains the query element, wherein the second set of files is a subset of the first set. Information identifying files in the second set of files is then output.

According to an embodiment of the present invention, at least some of the data structure that is used to perform the search is encrypted. The first set of files from the plurality of encrypted files is determined by decrypting a portion of the data structure, and determining the membership of the first set of files based upon the decrypted portion of the data structure.

The foregoing, together with other features, embodiments, and advantages of the present invention, will become more apparent when referring to the following specification, claims, and accompanying drawings.

DETAILED DESCRIPTION OF THE INVENTION

The present invention provides techniques for efficiently searching an encrypted searchable space. According to embodiments of the present invention, only a portion of the encrypted space needs to be decrypted in order to perform the search. The encrypted searchable space may correspond to a plurality of files stored in encrypted form. According to an embodiment of the present invention, the search techniques determine a set of files comprising one or more files from the plurality of encrypted files that contain a user-specified query element. The set of files is usually determined by decrypting only a subset of the plurality of encrypted files.

Figure 1:
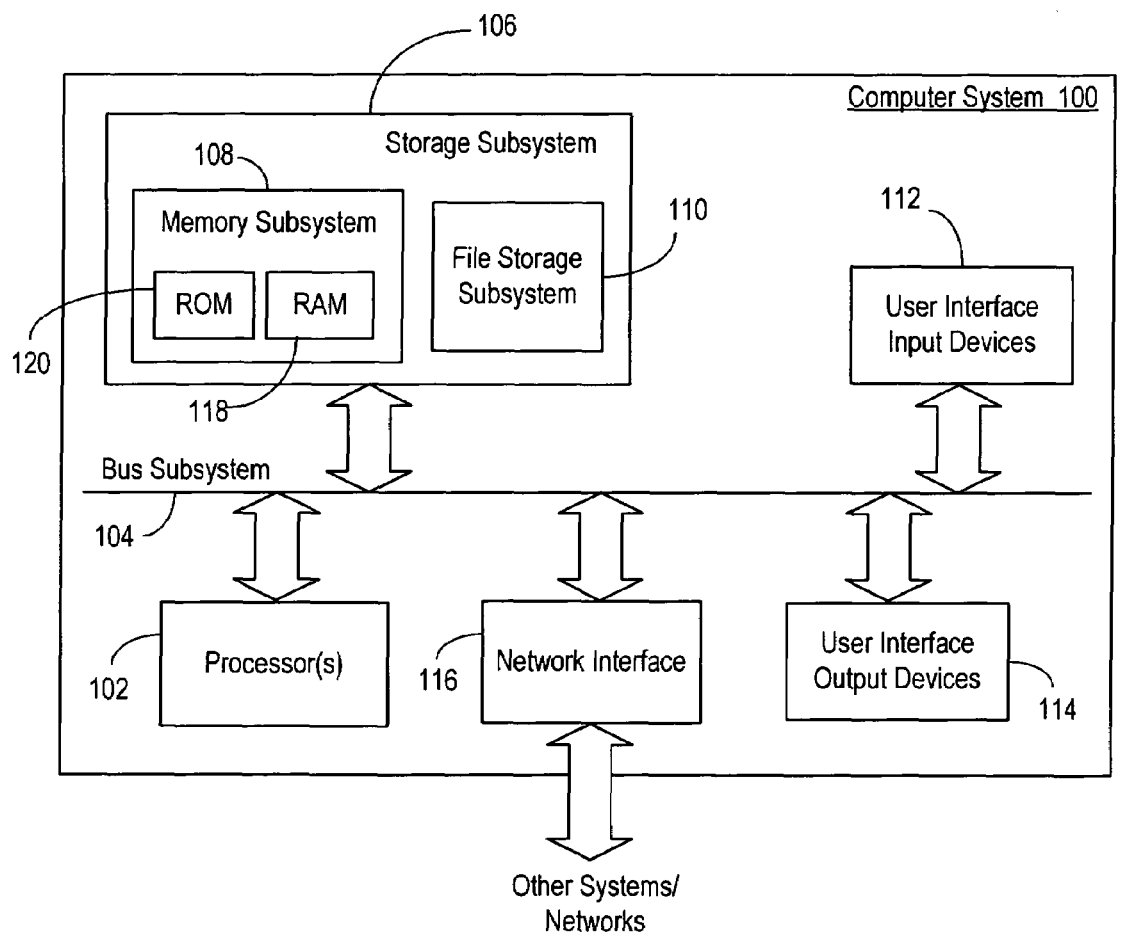
FIG. 1 is a simplified block diagram of a computer system that may be used to search encrypted (or ciphertext) files according to an embodiment of the present invention.

FIG. 1 is a simplified block diagram of a computer system 100 that may used to search encrypted searchable spaces (e.g. encrypted files) according to an embodiment of the present invention. As shown in FIG. 1, computer system 100 includes at least one processor 102, which communicates with a number of peripheral devices via a bus subsystem 104. These peripheral devices may include a storage subsystem 106, comprising a memory subsystem 108 and a file storage subsystem 110, user interface input devices 112, user interface output devices 114, and a network interface subsystem 116. The input and output devices allow user interaction with computer system 100. A user may be a human user, a device, a process, another computer, or the like.

Network interface subsystem 116 provides an interface to other computer systems and communication networks. Embodiments of network interface subsystem 116 include an Ethernet card, a modem (telephone, satellite, cable, ISDN, etc.), (asynchronous) digital subscriber line (DSL) units, or the like. The computer networks may include the Internet, local area networks (LANs), wide area networks (WAN), wireless networks, intranets, private networks, public networks, switched networks, or the like.

User interface input devices 112 may include a keyboard, pointing devices such as a mouse, trackball, touchpad, or graphics tablet, a scanner, a barcode scanner, a touchscreen incorporated into the display, audio input devices such as voice recognition systems, microphones, or other types of input devices. In general, use of the term "input device" is intended to include all possible types of devices and ways to input information using computer system 100.

User interface output devices 114 may include a display subsystem, a printer, a fax machine, or non-visual displays such as audio output devices. The display subsystem may be a cathode ray tube (CRT), a flat-panel device such as a liquid crystal display (LCD), or a projection device. In general, use of the term "output device" is intended to include all possible types of devices and ways to output information from computer system 100.

Storage subsystem 106 may be configured to store the basic programming and data constructs that provide the functionality of the present invention. For example, according to an embodiment of the present invention, software modules implementing the functionality of the present invention may be stored in storage subsystem 106. These software modules may be executed by processor(s) 102. In a distributed environment, the software modules may be stored on a plurality of computer systems and executed by processors of the plurality of computer systems. Storage subsystem 106 may also provide a repository for storing various databases and data structures that may be used to store information according to the teachings of the present invention. Storage subsystem 106 may comprise memory subsystem 108 and file storage subsystem 110.

Memory subsystem 108 may include a number of memories including a main random access memory (RAM) 118 for storage of instructions and data during program execution and a read only memory (ROM) 120 in which fixed instructions are stored. File storage subsystem 110 provides persistent (non-volatile) storage for program and data files, and may include a hard disk drive, a floppy disk drive along with associated removable media, a Compact Disk Read Only Memory (CD-ROM) drive, an optical drive, removable media cartridges, or other like storage media. One or more of the drives may be located at remote locations on other connected computers.

Bus subsystem 104 provides a mechanism for letting the various components and subsystems of computer system 100 communicate with each other as intended. The various subsystems and components of computer system 100 need not be at the same physical location but may be distributed at various locations. Although bus subsystem 104 is shown schematically as a single bus, alternative embodiments of the bus subsystem may utilize multiple busses.

Computer system 100 itself can be of varying types including a personal computer, a portable computer, a workstation, a computer terminal, a network computer, a mainframe, a kiosk, a personal digital assistant (PDA), a communication device such as a cell phone, an entertainment console (PS2, X-box), or any other data processing system. Due to the ever-changing nature of computers, the description of computer system 100 depicted in FIG. 1 is intended only as a specific example for purposes of illustrating the preferred embodiment of the present invention. For example, other types of processors are contemplated, such as the Athlon™ class microprocessors from AMD, the Pentium™-class or Celeron™-class microprocessors from Intel Corporation, PowerPC™ G3 or G4 microprocessors from Motorola, Inc., Crusoe™ processors from Transmeta, Inc. or the like. Further, other types of operating systems are contemplated in alternative embodiments including Windows™ operating systems (e.g., Win95, Win98, WindowsNT™, WindowsXP™, etc.) from Microsoft, Solaris from Sun Microsystems, LINUX, UNIX, MAC OS X from Apple Computer Corporation, or the like. Many other configurations of a computer system are possible having more or fewer components than the computer system depicted in FIG. 1.

The present invention may also be embodied in a distributed network environment comprising one or more client and server computers. In such a network environment, processing performed according to the teachings of the present invention may be distributed among one or more computer systems of the network environment.

As indicated above, the present invention provides techniques for efficiently searching an encrypted searchable space containing elements from some domain $\Sigma$. As indicated above, domain $\Sigma$ can be any arbitrary domain, e.g., domain of integers, domain of real numbers, domain of string of alphanumeric characters, or the like. For purposes of describing the present invention, it is assumed that the encrypted searchable space corresponds to a plurality of files that are stored in encrypted form or as ciphertext. The plurality of files may comprise files from one or more file systems. In response to receiving a search request comprising information identifying a query element (which may be an element from a domain $\Sigma$), the present invention determines one or more files from the plurality of files that contain at least one occurrence of the query element.

Figure 2:
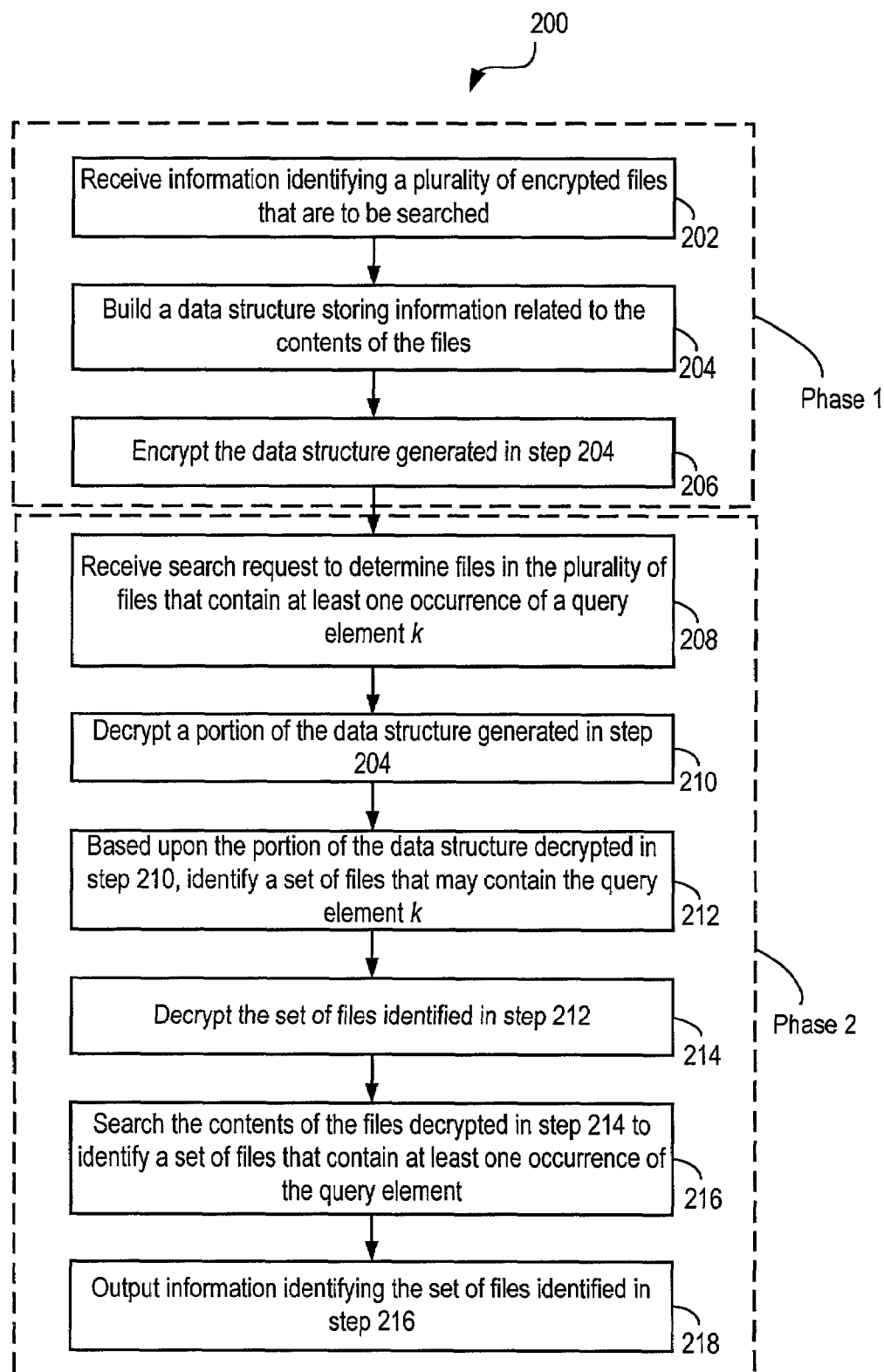
FIG. 2 is a high-level simplified flowchart of a method of searching encrypted searchable spaces according to an embodiment of the present invention.

FIG. 2 is a high-level simplified flowchart 200 depicting a method of searching encrypted searchable spaces according to an embodiment of the present invention. The method depicted in FIG. 2 may be performed by software modules executing on computer system 100, hardware modules coupled to computer system 100, or combinations thereof. In alternative embodiments, the processing depicted in FIG. 2 may be performed by one or more computer systems. Flowchart 200 depicted in FIG. 2 is merely illustrative of an embodiment incorporating the present invention and does not limit the scope of the invention as recited in the claims. One of ordinary skill in the art would recognize variations, modifications, and alternatives.

According to the embodiment depicted in FIG. 2, processing for searching encrypted files is divided into two phases. During the first phase, one or more data structures or other like memory structures are generated that store information related to the contents of the plurality of encrypted files to be searched. The information stored by the one or more data structures generated in the first phase is then used to search the encrypted files during the second phase to identify one or more files from the plurality of files that contain at least one occurrence of a user-specified query element.

According to an embodiment of the present invention, the first phase of processing is initiated when computer system 100 receives information identifying a plurality of encrypted files that are to be searched (step 202). The plurality of files forms the searchable space. The plurality of files may include files from one or more file systems. The encrypted files may be stored in a memory location accessible to computer system 100. For example, the files may be stored in storage subsystem 106 of computer system 100, in databases, on disks, on some computer-readable medium accessible to computer system 100, or the like. The files may be stored on a singe computer-readable medium or may be stored on multiple com-readable media.

A user of the present invention may provide the information in step 202. According to an embodiment of the present invention, the user may specifically identify the files included in the plurality of files to be searched. In alternative embodiments, the user may specify a file system, or a storage device, etc. storing the files to be searched.

The files identified in step 202 are then processed and a data structure (or any other memory storage structure) is built storing information related to the contents of the plurality of encrypted files (step 204). One or more data structures may be generated in step 204 to store information related to contents of the encrypted files. As described below, various different techniques may be used to generate the data structure(s) in step 204. The data structure(s) built in step 204 may be of various different types including one or more tables, databases, linked lists, trees, graphs, hierarchical structures, or the like.

The data structure generated in step 204 is then encrypted (step 206). Various different encryption techniques known to those skilled in the art may be used for encrypting the data structure. The encrypted data structure may then be stored in a memory location accessible to a computer system 100 that is configured to search the plurality of files. The data structure is then used to process search requests during the second phase.

It should be understood that the processing performed in the first phase and the second phase may be performed by the same computer system or may be performed by different computer systems. For example, according to an embodiment of the present invention, the computer systems that generates the data structure during the first phase may also be configured to service search request during the second phase. In alternative embodiments, the data structure encapsulating information related to the contents of the encrypted files to be searched (i.e., the files included in the searchable space) may be built by a first computer system. The data structure may then be made accessible to a second computer system that is configured to service search requests.

According to an embodiment of the present invention, processing in the second phase is initiated when a computer system 100 that is configured to service search requests receives a search request to identify files in the plurality of encrypted files that contain at least one occurrence of a query element k (step 208). For example, if the plurality of files contain elements from a domain $\Sigma$, the query element may be an element from domain $\Sigma$. For example, if domain $\Sigma$ comprises character strings or arrays having 1 to 255 elements with each element being an alphanumeric character or punctuation, then query element k may correspond to one or more character strings from domain $\Sigma$.

The search request may be configured by a user using one or more input devices coupled to computer system 100. The search request may also be received from a process executing on computer system 100. The search request may also be received from devices or systems coupled to computer system 100. For example, in a distributed environment, the search request may be received by computer system 100 from another computer system coupled to computer system 100 via network interface 106.

In response to receiving the search request, computer system 100 then decrypts a portion of the data structure that was generated in step 204 and encrypted in step 206 (step 210). According to an embodiment of the present invention, the portion decrypted in step 210 may correspond to the entire data structure. In other embodiments of the present invention, the portion decrypted in step 210 may correspond to a portion of the data structure that is smaller than the entire data structure. The portion of the data structure decrypted in step 210 depends on the query element received in step 208.

Based upon the information stored by the portion of data structure that is decrypted in step 210, computer system 100 identifies a set of files from the plurality of files that may contain the query element k received in step 208 (step 212). As described below, various different techniques may be used to identify the set of files that may contain the query element. The number of files identified in step 212 is usually a subset of the total files in the plurality of files.

If it is determined in step 212 that the query element is not contained by any file in the plurality of files, then a signal may be output to the source of the search request indicating that the query element specified in the search request is not contained by any file in the plurality of files. The search process is then terminated.

Assuming that the query element is contained by at least one file in the plurality of files, the one or more files in the set of files identified in step 212 are then decrypted (step 214). Since the set of files identified in step 212 is generally a subset of the plurality of encrypted files, according to the teachings of the present invention, only a subset of the encrypted files need to be decrypted to service the search request. By reducing the amount of decryption needed to service the search request, the overall performance of the search is improved.

The contents of the files decrypted in step 214 are then searched to identify a set of one or more files that contain at least one occurrence of the query element received in step 208 (step 216). Various different search techniques known to those skilled in the art may be used to search the decrypted files to identify files that contain at least one occurrence of the query element. The set of files identified in step 216 may be a subset of the set of files identified in step 212 and decrypted in step 214.

Information identifying the set of one or more files identified in step 216 may then be output to the user or source of the search request (step 218). If no files were identified in step 216, a signal may be output to the user indicating that the plurality of files does not include any file that contains the query element.

Embodiments of the present invention strive to minimize the amount of decryption that has to be performed to service a search request. As described above, the search may be performed by decrypting (in step 210) only a portion of the database that stores information related to contents of the plurality of files. Additionally, the number of files decrypted in step 214 is usually a subset of the total files in the plurality of files. By reducing the number of decryption operations, the present invention reduces the number of memory and processing resources needed for the search. The time required to perform the search is also improved.

The following sections describe examples of search techniques that use variations of the method depicted in FIG. 2 to search encrypted searchable spaces in an efficient manner while minimizing the memory resources required to perform the searches. For purposes of describing the present invention it is assumed that the encrypted searchable space corresponds to a plurality of encrypted files. The plurality of encrypted files may comprise encrypted files from one or more file systems.

First Search Technique

According to the first search technique, an index table is generated during the first phase of the processing. The index table stores indexing information related to the contents of the plurality of encrypted files. According to an embodiment of the present invention, the index table stores one or more entries, wherein each entry contains a word (or element from the search domain) and information identifying one or more files from the plurality of files that contain at least one occurrence of the word. For example, according to an embodiment of the present invention, each entry in the index table identifies a word and names of one or more files that contain the word. In alternative embodiments, each entry in the index table may identify a word and store references or pointers to one or more files from the plurality of files that contain at least one occurrence of the word.

Accordingly, each entry in an index table built according to the first search technique is of the form: (<word>, <file>), where <word> identifies a word, and <file> identifies one or more files from the plurality of files that contain the word identified by <word>. In order to minimize the size of the index table, only one entry is stored for each word even though the word may occur multiple times in one or more files. Accordingly, each (<word>, <file>) entry in the index table is unique (i.e., no duplicates). The index table is stored in encrypted form.

Figure 3:
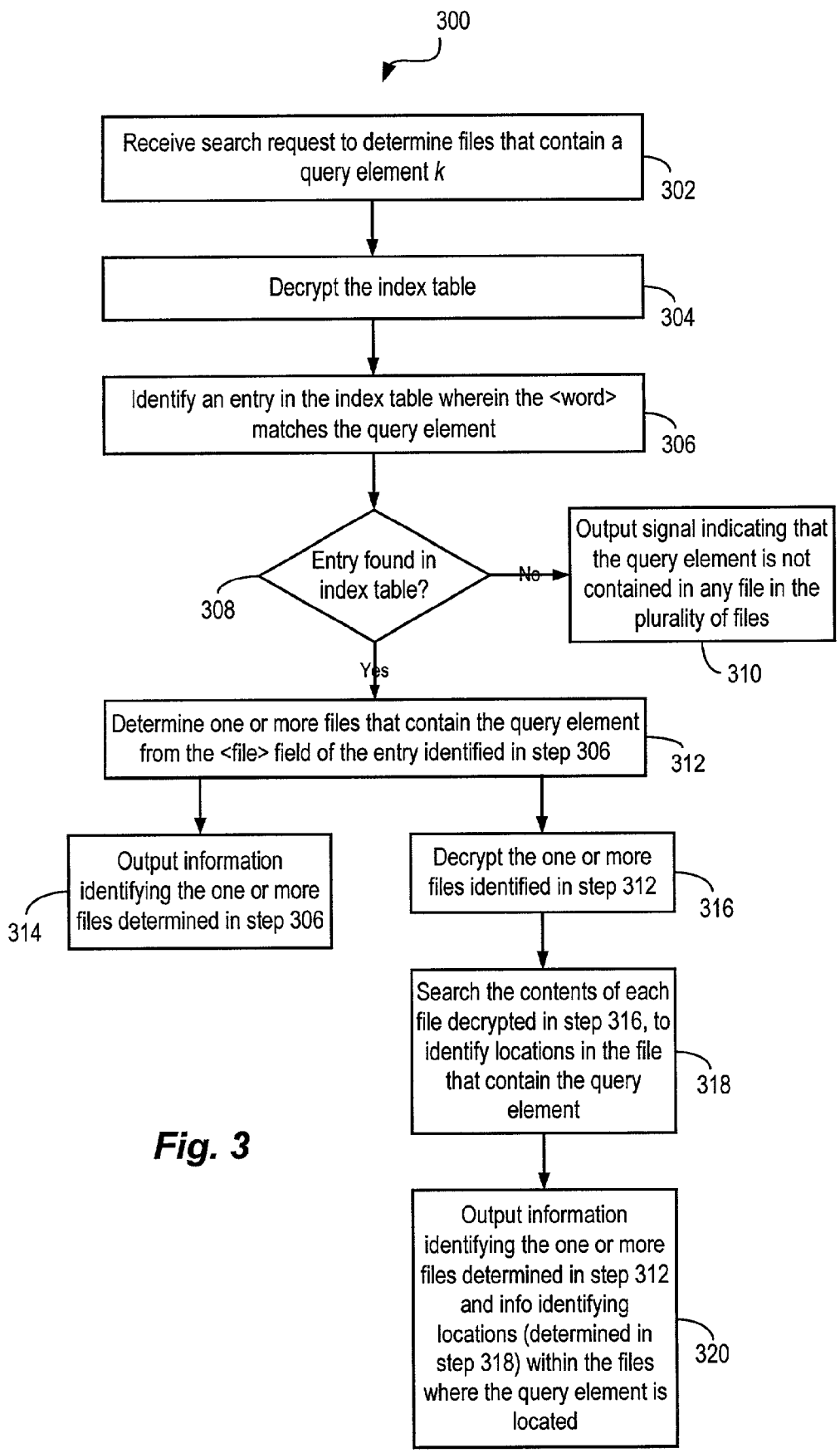
FIG. 3 is a high-level simplified flowchart of a method of searching encrypted searchable spaces according to an embodiment of the present invention applying the first search technique.

FIG. 3 is a simplified high-level flowchart 300 of a method of searching encrypted searchable spaces according to an embodiment of the present invention applying the first search technique. The method depicted in FIG. 3 may be performed by software modules executing on computer system 100, hardware modules coupled to computer system 100, or combinations thereof. In alternative embodiments, the processing may be performed by one or more computer systems. Flowchart 300 depicted in FIG. 3 is merely illustrative of an embodiment incorporating the present invention and does not limit the scope of the invention as recited in the claims. One of ordinary skill in the art would recognize variations, modifications, and alternatives.

As depicted in FIG. 3, processing is initiated when computer system 100 that is configured to perform the search receives a search request to identify files in the plurality of encrypted files that contain at least one occurrence of a query element k (step 302). A user of computer system 100 using one or more input devices coupled to computer system 100 may configure the search request. Alternatively, the search request may be received from a process executing on computer system 100. The search request may also be received from devices or systems coupled to computer system 100. For example, in a distributed system, the search request may be received by computer system 100 from another computer system coupled to computer system 100 via network interface 106.

In response to receiving the search request, computer system 100 decrypts the index table that has been built according to the teachings of the first search technique (step 304). The decrypted index table is then searched to identify an entry in the index table whose <word> matches the query element (step 306). If it is determined (step 308) that there is no entry in the index table where <word> matches the query element, it indicates that the query element is not found in any file in the plurality of files. A signal is then output indicating that the query element is not contained in any file in the plurality of encrypted files (step 310).

If a matching entry is found in step 306, it indicates that at least one file in the plurality of files contains the query element. One or more files that contain the query element are determined from the <file> field of the matching index table entry identified in step 306 (step 312). According to an embodiment of the present invention, information identifying the files determined in step 312 is then output to the user or source of the search request (step 314). According to the teachings of the present invention, the set of files identified in step 312 is usually a subset of the plurality of files. For example, if the plurality of files comprises M files (where M≧2), and the set of files identified in step 312 comprises Z files, then Z is generally less than M, but in some cases Z may be equal to M.

In an alternative embodiment of the present invention, the one or more files that are determined in step 312 are decrypted (step 316). The contents of each file decrypted in step 316 are then searched to identify locations within the file of the query element (step 318). Information identifying the files determined in step 312 and information identifying locations within the files where the query element is located are then output to the user (step 320).

As described above, according to the first search technique, information identifying one or more files that contain the query element is determined without decrypting the files. Only the index table is decrypted to identify files that contain at least one occurrence of the query element. This reduces the number of decryption operations needed for the search. Further, if the search request requests (in addition to identifying the files) information identifying locations of the query element within the files, then the information indicating the locations is determined by decrypting only those files that are identified to contain at least one occurrence of the query element.

Second Search Technique

According to the second technique, the searchable space (i.e., the plurality of encrypted files to be searched) is partitioned into blocks or "entities" based upon a parameter P (hereinafter referred to as the "file partition parameter" P). File partition parameter P may be specified in terms of bytes, Kbytes, Mbytes, Gbytes, or other memory measurement units. The parameter may be specified by a user of the present invention. Information mapping words to entities that contain the words and information mapping entities to files that constitute the entities is then stored in data structures accessible to computer system 100 that is configured to perform the search. For example, the information mapping information may be stored in one or more tables accessible to computer system 100. The information stored in the tables is then used to service search requests.

Various different techniques may be used for partitioning the files. According to one technique, if the size of a first file is more than P, a first portion of the file (measuring P) may be allocated to a first entity and the remaining portion of the first file may be allocated to a second entity. Other files may be grouped into the second entity to fill the capacity (specified by file partition parameter P) of the entity. For files of size less than P, many such files may be grouped into a single entity. Various other techniques may also be used to group files from the plurality of files to be searched into one or more entities. For each entity, information (hereinafter referred to as "entity-to-file mapping information") identifying the one or more files that constitute or are grouped into the entity is stored in a memory location accessible to the computer system that is configured to perform the searches. The entity-to-file mapping information may be stored in encrypted form.

According to an embodiment of the present invention, each entry in a table storing entity-to-file mapping information built by applying the second search technique may be of the form: (<entity>, <file>), where <entity> identifies a particular entity, and <file> identifies one or more files that are grouped into the entity identified by <entity>. The table storing the entity-to-file information may be stored in encrypted form.

The size of the table storing the entity-to-file mapping information depends upon the value of file partition parameter P. The size of the table is inversely proportional to the value of P for a given set of files. For a given plurality of files, as the value of P is decreased, the number of entities into which the files are partitioned increases and as a result the number of entries in the table increases, thereby increasing memory resources required for storing the table. Conversely, when the value of P is increased, the number of entities into which the plurality of files is partitioned decreases. As a result the number of entries stored in table decreases, thereby reducing the memory resources required for storing the table. According to the teachings of the present invention, the value of file partition parameter P may be appropriately chosen to strike a balance between memory resources needed for storing the table and the time needed to process a search request, which is often related to the size of the partition. One formula for determining an appropriate value for P is described below.

Figures 4A, 4B:
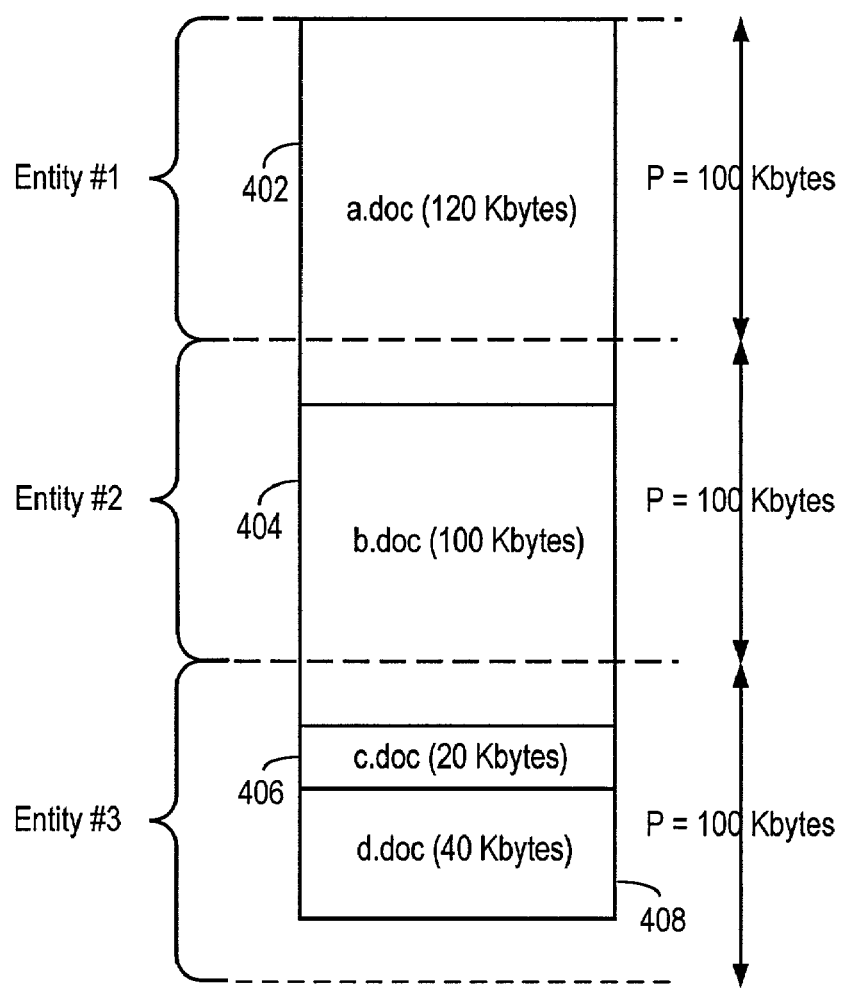
FIG. 4A depicts an example of how a plurality of files comprising four files may be grouped into entities according to an embodiment of the present invention.
FIG. 4B depicts a simplified table that stores entity-to-file mapping information according to an embodiment of the present invention.

FIG. 4A depicts an example of how a plurality of files comprising four files may be grouped into entities according to an embodiment of the present invention. As shown in FIG. 4A, the plurality of encrypted files to be searched comprises four files, namely, "a.doc" 402, "b.doc" 404, "c.doc" 406, and "d.doc" 408. File "a.doc" is of size 120 Kbytes, "b.doc" is of size 100 Kbytes, "c.doc" is of size 20 Kbytes, and "d.doc" is of size 40 Kbytes. For the example depicted in FIG. 4, file partition parameter P has been configured to be 100 Kbytes. As shown, the plurality of files has been partitioned into three entities. The first entity (Entity #1) comprises a first portion (100 Kbytes) of file "a.doc," the second entity (Entity #2) comprises a second portion (20 Kbytes) of file "a.doc" and a first portion (80 Kbytes) of file "b.doc," and the third entity (Entity #3) comprises a second portion (20 Kbytes) of file "b.doc" and files "c.doc" and "d.doc." It should be apparent that various other techniques known to those skilled in the art may be used for partitioning the plurality of files into entities.

FIG. 4B depicts a simplified table that stores entity-to-file mapping information according to an embodiment of the present invention. The table depicted in FIG. 4B stores information corresponding to the partitioning depicted in FIG. 4A. As shown, the first entity (Entity #1) maps to file "a.doc", the second entity (Entity #2) maps to files "a.doc" and "b.doc", and the third entity (Entity #3) maps to files "b.doc", "c.doc", and "d.doc".

According to the second search technique, an index table is generated that stores information related to the contents of the plurality of encrypted files as partitioned into entities. According to an embodiment of the present invention, each entry in the index table identifies a word (or element) and information identifying one or more entities that contains at least one occurrence of the word. Accordingly, the information stored in the index table may also be referred to as "word-to-entity mapping information". In alternative embodiments, each entry in the index table may identify a word and store references or pointers to one or more entities that contain at least one occurrence of the word. Further, in other embodiments of the present invention, the word-to-entity information and entity-to-file information may be stored in one index table and referred to as indexing information.

According to an embodiment of the present invention, each entry in an index table storing word-to-entity mapping information built by applying the second search technique is of the form: (<word>, <entity>), where <word> identifies a word, and <entity> identifies one or more entities that contain at least one occurrence of the word identified by <word>. In order to minimize the size of the index table, only one entry is stored for each word even though the word may occur multiple times in one or more entities. As a result, each entry in the index table storing word-to-entity mapping information is unique (i.e., no duplicates). The index table may be stored in encrypted form.

The size of the index table storing word-to-entity mapping information depends upon the value of file partition parameter P. For a given plurality of files, when P decreases, the number of entities into which the files are partitioned increases. Since the size of an entry for a word might depend on the number of partitions that contain the word and does not increase for repeated instances of the word in a partition, smaller partitions can be expected to result in a larger index table, thereby increasing memory resources required for storing the index table. Conversely, when P increases, the number of entities into which the files are partitioned might be expected to decrease, thereby reducing the memory resources required for storing the index table. According to the teachings of the present invention, the value of file partition parameter P may be appropriately chosen to strike a balance between memory resources needed for storing the index table and the time needed to process a search request. A formula for determining an appropriate value for P is described below.

Figure 5:
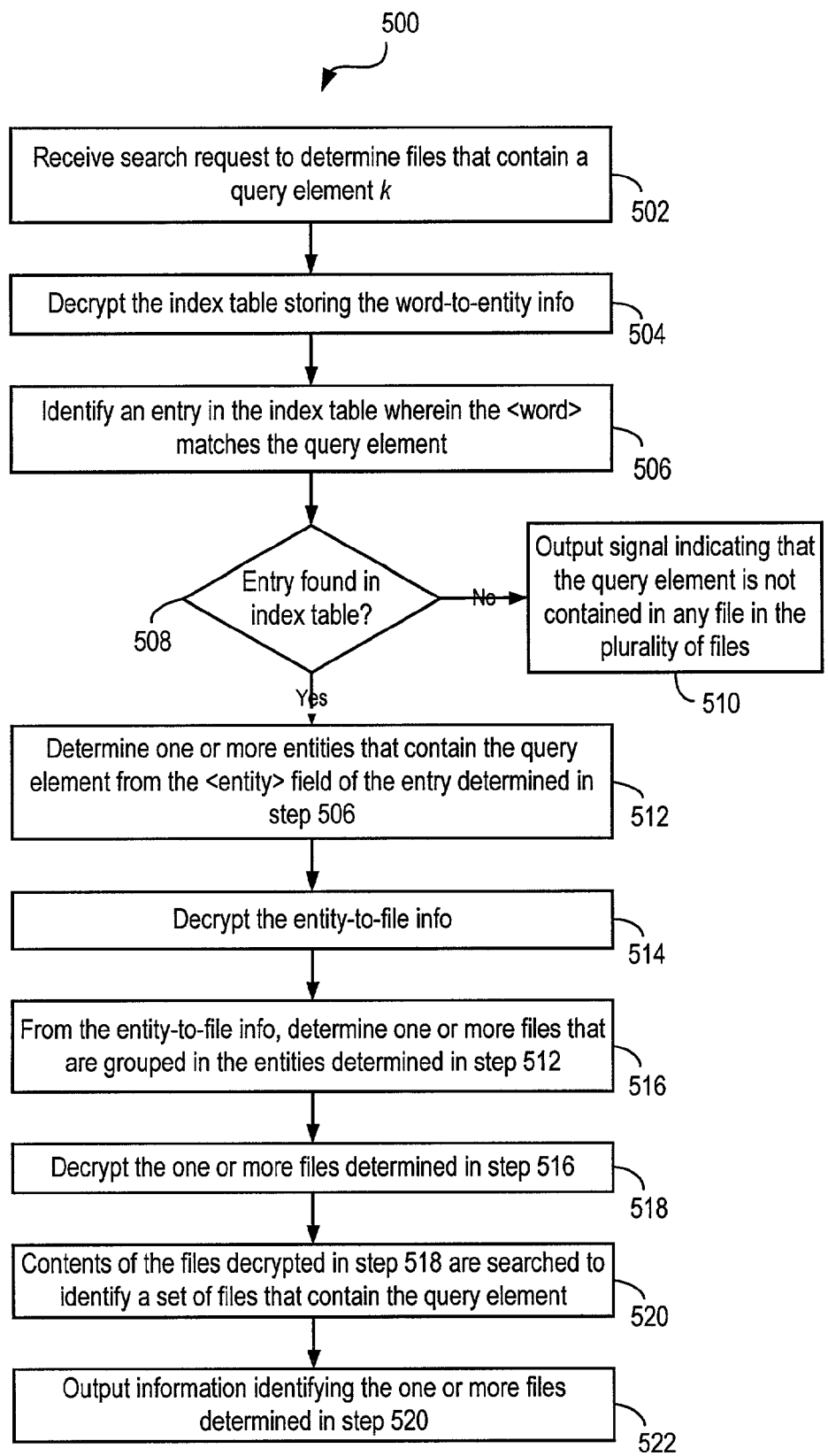
FIG. 5 is a high-level simplified flowchart of a method of searching encrypted searchable spaces according to an embodiment of the present invention applying the second search technique.

FIG. 5 is a high-level simplified flowchart 500 depicting a method of searching encrypted searchable spaces according to an embodiment of the present invention applying the second search technique. The method depicted in FIG. 5 may be performed by software modules executing on computer system 100, hardware modules coupled to computer system 100, or combinations thereof. In alternative embodiments, the processing may be performed by one or more computers systems. Flowchart 500 depicted in FIG. 5 is merely illustrative of an embodiment incorporating the present invention and does not limit the scope of the invention as recited in the claims. One of ordinary skill in the art would recognize variations, modifications, and alternatives.

As depicted in FIG. 5, processing is initiated when computer system 100 receives a search request to determine files in the plurality of encrypted files that contain at least one occurrence of a query element k (step 502). A user of computer system 100 using one or more input devices coupled to computer system 100 may configure the search request. Alternatively, the search request may be received from a process executing on computer system 100. The search request may also be received from devices or systems coupled to computer system 100. For example, in a networked environment, the search request may be received by computer system 100 from another computer system coupled to computer system 100 via network interface 106.

In response to receiving the search request, computer system 100 decrypts the index table storing the word-to-entity information that has been generated according to the teachings of the second search technique (step 504). The decrypted index table is then searched to identify an entry in the index table whose <word> matches the query element (step 506). If it is determined (step 508) that there is no entry in the index table whose <word> matches the query element, it indicates that the query element is not found in any file in the plurality of files. A signal is then output indicating that the query element is not contained in any file in the plurality of files (step 510).

If a matching entry is found in step 506, it indicates that at least one file in the plurality of files contains the query element. One or more entities that contain the query element are determined from the <entity> field of the matching index table entry determined in step 506 (step 512).

The entity-to-file information is then decrypted (step 514). According to an embodiment of the present invention, the entity-to-file information may be decrypted in step 504 when the word-to-entity information is decrypted. According to an alternative embodiment of the present invention, step 514 may not be performed if the entity-to-file information is stored in non-encrypted plaintext form.

The entity-to-file information is then used to determine one or more files that are grouped in the entities determined in step 512 (step 516). The files identified in step 516 are generally a subset of the plurality of files and represent files that may contain the query element. For example, if M files are included in the plurality of files and Z files are identified in step 516, then Z is generally less than M, but in some cases Z may be equal to M.

The one or more files that are determined in step 516 are then decrypted (step 518). The contents of the files decrypted in step 518 are then searched to identify a set of one or more files that contain at least one occurrence of the query element (step 520). The files identified in step 520 may be a subset of the files identified in step 516. For example, if Z files are determined in step 516 and J files are identified in step 520, then $J \leq Z$. The location of the query element in the files may also be determined as part of step 520. Information identifying the one or more files determined in step 520 is then output to the user (step 522). As part of step 522, information identifying locations of the query element within the files may also be output.

As described above, according to the second search technique, information identifying files that contain the query element can be determined by decrypting only a subset of the files in the plurality of files. This provides substantial savings in the time needed to process a search request while minimizing the memory resources required to perform the search. Using the file partition parameter that is capable of grouping many small files into one entity and of partitioning a large file into many entities results in improved performance.

As stated above, according to the teachings of the second search technique, the value of file partition parameter P may be appropriately chosen to strike a balance between memory resources needed for storing the indexing information and the time needed to process a search request. There are approximately three time costs associated with servicing a search request according to the second search technique. These costs include (1) the cost of decrypting (step 504) and searching (step 506) the index table storing the word-to-entity information; (2) the cost of decrypting (step 518) the relevant files determined in step 516; and (3) the time needed to search (step 520) the relevant decrypted files. According to an embodiment of the present invention, the value of file partition parameter P may be optimized such that the total costs associated with processing a search request are minimized.

In order to determine the optimal value of P according to one method, it will be assumed that the query element comprises a single word w. It should however be apparent that a query element may comprise multiple words.

The time needed to decrypt a file is generally proportional to the size of the file. Let this time be cn, where n is the size of the file and c is a constant. Let the files 1, 2, . . . , N of the plurality of files be of sizes $f_1, f_2, \ldots, f_N$. Also let $$F = \sum_{i=1}^{N} f_i$$

specify the total size of the plurality of files to be searched.

For a given word w and a file i, assume that the number of times that w occurs in file i is binomially distributed with parameters $(\epsilon, f_i)$, for some $\epsilon$. This implies that the expected number of times w occurs in file i is $f_i\epsilon$. The probability that w does not occur in file i is $(1-\epsilon)^{f_i}$. Thus, the probability that w occurs at least once in file i is $1-(1-\epsilon)^{f_i}$. Let $\epsilon_i$ denote this probability.

As previously described, the size of the index table storing the word-to-entity information can be expected to increase when P decreases. The number of pointers likely to be needed, and thus the size of the address space in the index table is $$\sum_{i=1}^{N} \left\lceil \frac{f_i}{P} \right\rceil \leq \frac{F}{P} + N.$$

Thus the number of bytes B, needed for each pointer in the index table would satisfy:

$$B \leq \left\lceil \frac{\log(F/P + N)}{8} \right\rceil.$$

Let the number of pointers in any file i be $$d\frac{f_i}{P},$$

for some appropriate d. Then, the size of the index table will be $$d\frac{F}{P}B.$$

The cost of decrypting and searching the index table would then be $$cd\frac{F}{P}B.$$

Since the probability that w occurs in file i at least once is $\epsilon_i$, the probability that a given file i will be decrypted is $\epsilon_i$. Thus, the total expected cost of decrypting all the relevant files is $$c\sum_{i=1}^{N} \epsilon_i f_i = cF', \text{ where } F' \sum_{i=1}^{N} \epsilon_i f_i.$$

As described above, after decrypting the files, the relevant entities of the decrypted files are searched. The expected time needed to search through the relevant entities of file i is no more than $\min\{\epsilon_i cf_i, \epsilon_i \epsilon f_i cP\} \geq c\epsilon\epsilon_i f_i P$. Summing that term over all partitions, the expected time needed for step 520 in FIG. 5 is no more than $c\epsilon F'P$.

Put together, the total expected time to process the search query is no more than $$\frac{cdF}{P}B + cF' + cF'P\epsilon.$$

Here, B is a function of F, P, and N. Since such a function would only be logarithmic with respect to (F/P+N), an approximate analysis could treat B as being independent of P (one possible approximation for $$B \text{ is } \left\lceil \frac{\log N}{4} \right\rceil).$$

A minimum this total expected time as a function of P occurs at $$P = \sqrt{\frac{cdFB}{cF'\epsilon}} = \sqrt{\frac{dBF}{F'\epsilon}}.$$

The parameters c, d, and $\epsilon$ might be estimated by empirically examining the characteristics of the files in plurality of files to be searched such as the sizes of the individual files, the file content type, the amount of memory resources available for the processing, the amount of time permissible for the processing, and other characteristics of the plurality of files.

Third Search Technique

The third search technique is an extension of the first search technique and the second search technique described above. The third search technique can be applied to encrypted as well as plaintext files. As discussed above, according to the second search technique, the word-to-entity information is stored in a single index table with entries of the form (<word>, <entity>) and the entire index table needs to be decrypted (in step 504 depicted in FIG. 5) when processing a search request. According to the third search technique, the information stored by the single index table generated according to the second search technique is divided into multiple index tables, i.e., the word-to-entity information is divided among a plurality of index tables with each index table storing a portion of the word-to-entity information.

For example, if the plurality of files contained strings from a domain Σ comprising alphanumeric characters (i.e., characters A-Z, a-z, 0-9), then the word-to-entity information (of the form (<word>, <entity>) as described above) may be spread across 27 index tables as follows: index table #1 stores entries for words starting with "a" or "A", index table #2 stores entries for words starting with "b" or "B", index table #3 stores entries for words starting with "c" or "C", index table #4 stores entries for words starting with "d" or "D", and so on, and index table #27 stores entries for words starting with numerals "1-9". In this manner, according to the teachings of the third search technique, the word-to-entity information is spread across multiple index tables.

Figure 6:
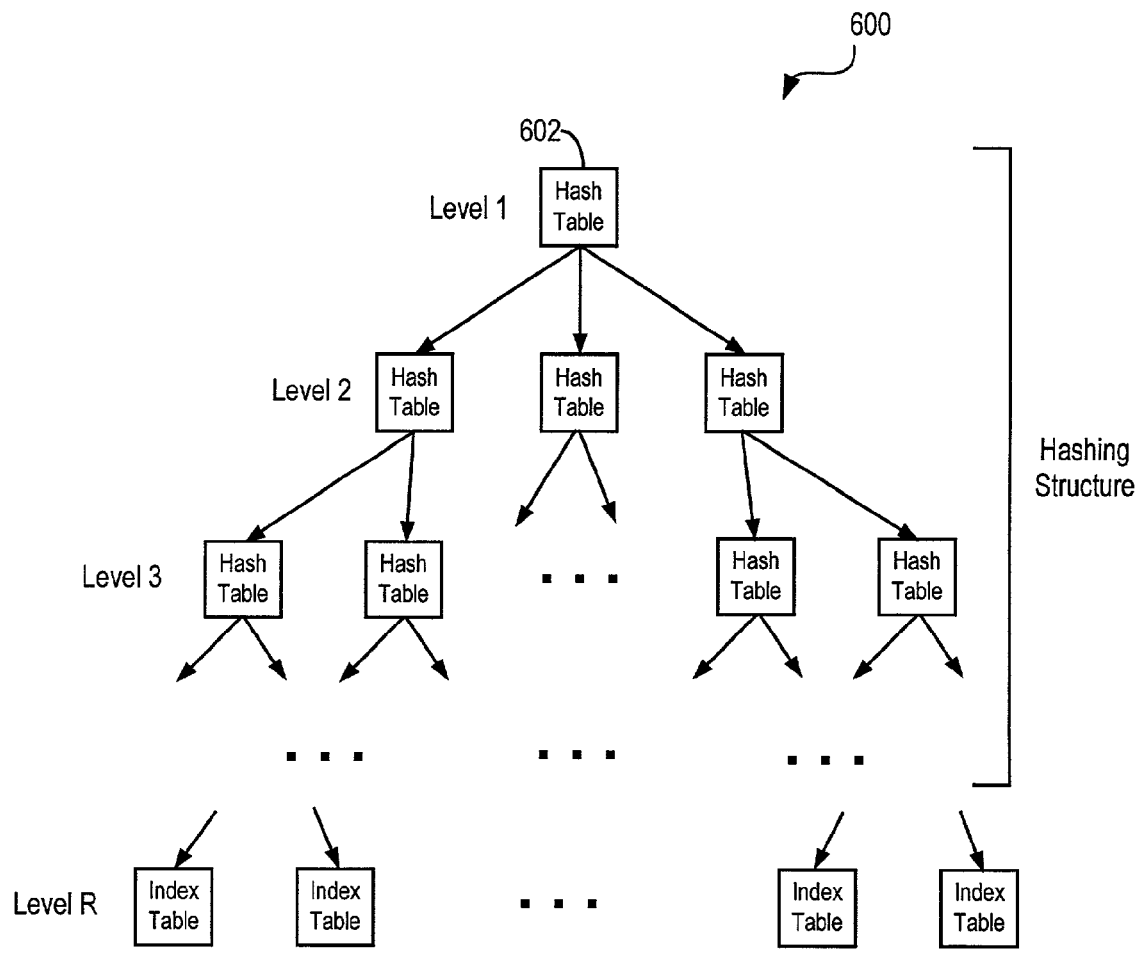
FIG. 6 is simplified block diagram of a hierarchical data structure generated according to an embodiment of the present invention applying the third search technique.

According to the third search technique, the data structure that is built to facilitate the search comprises a hierarchical system of hashing tables that store hashing information and index tables that store the word-to-entity information. FIG. 6 is simplified block diagram of a hierarchical data structure 600 generated according to an embodiment of the present invention applying the third search technique. As depicted in FIG. 6, data structure 600 comprises a plurality of hierarchically organized tables, including hash tables and index tables. The hash tables and index tables are stored in encrypted form. According to the teachings of the third search technique, data structure 600 comprises a plurality of levels headed by a root hash table 602 at level 1. The data structure depicted in FIG. 6 comprises R levels. As shown in FIG. 6, a table at a particular level L (except tables at level R which form the leaves of the data structure) has pointers that point to one or more tables at level (L+1). For example, as shown in FIG. 6, hash table 602 at level 1 has pointers to three tables at level 2, the tables at level 2 have pointers to tables at level 3, and so on until the index tables at level R are reached.

The number of levels to be used for generating the data structure can be empirically determined from the properties of the plurality of files to be searched. For example, according to an embodiment of the present invention, the value of R may be determined based upon the sizes of individual files in the plurality of files, the content types of the files, the amount of memory resources available for performing the search, the amount of time permissible for building the data structure and for processing the search request, and upon other like characteristics.

According to the teachings of the third search technique, levels 1 through (R-1) of data structure 600 comprise hash tables, and level R comprises index tables that store the word-to-entity information. The tables of level 1 through level (R-1) thus form a hashing structure that may be used to reach or select a particular index table at level R. According to an embodiment of the present invention, each hash table in data structure 600 includes one or more entries of the form: (<hash value>, <child table>), where <hash value> indicates a hash value (or range of values) obtained from an input query element, and <child table> is a reference or pointer to a table at the next level associated with a particular hash value.

In alternative embodiments, a hash function may also be included in each hash table. In this embodiment, the hash function is applied to an input query element to generate a hash value for the input query element. The hash value generated for the query element is then matched to a hash value stored by the hash table to determine a particular pointer to a table at the next level. For hash tables at level 1 through level (R-2), the <child table> pointers point to hash tables at the next level. For hash tables at level (R-1), the <child table> pointers point to index tables at level R.

According to an embodiment of the present invention, each index table at level R stores a portion of the word-to-entity information. The word-to-entity information is thus spread across multiple index tables. As described below in further detail, the distribution of word-to-entity information among multiple index tables allows search requests to be processed by decrypting only a portion of the word-to-entity information (i.e., a portion stored by an index table that is selected by hashing the input query element). This reduces the decryption operations needed for servicing a search request that in turn improves the performance of the search technique.

Each index table at level R stores one or more entries of the form: (<word>, <entity>), where <word> identifies a word, and <entity> identifies one or more entities that contain the word identified by <word>. In order to minimize the size of the index table, only one entry is stored for each word even though the word may occur multiple times in one or more entities. Accordingly, the entries in the index tables are unique (i.e., no duplicates). As described above with respect to the second search technique, the number of entities into which the plurality of files is grouped is determined by the file partition parameter. In alternative embodiments, each entity may correspond to a single file in the plurality of files.

Various different hashing techniques may be used to generate the hashing structure (i.e., the tables and structure of levels 1 through (R-1)) of data structure 600. According to an embodiment of the present invention, the hashing is coarse at level 1 and becomes more and more refined as the levels increase. The hashing functions used for the hashing can be deterministic or can be randomized. The hashing functions are applied to the query element to select a particular index table at level R.

According to an embodiment of the present invention applying the third search technique, at level i of the hierarchy of data structure 600, the range for the hash functions is chosen as $[1, N_i]$ for some integer $N_i$ (for $1 \leq i \leq R-1$). For example, at level (R-1), $N_{R-1}$ is the number of entities that the plurality of files has been partitioned into Each query word w might be thought of as (or mapped to) an integer between 1 and M for some M. Let the hash function used at level i be $h_i : \{1, 2, \ldots, M\} \rightarrow \{1, 2, \ldots, N_i\}$. The function $h_i$ might be chosen to be: $h_i(w) = w \bmod N_i + 1$. Under the assumption of a uniform distribution in the input space, these functions map the words uniformly in the range $[1, N_i]$ at level i.

If the uniformity assumption is invalid, then one could achieve a similar performance in the worst case with high probability applying the technique described in M. Dietzfelbinger, J. Gil, Y. Matias, and N. Pippenger, *Polynomial Hash Functions Are Reliable*, Proc. ICALP, 1992, pp. 235-246, et al., the entire contents of which are herein incorporated by reference for all purposes. In Dietzfelbinger et al., it is shown that degree 3 polynomials yield reliable performance and behave similar to random functions.

Figure 7:
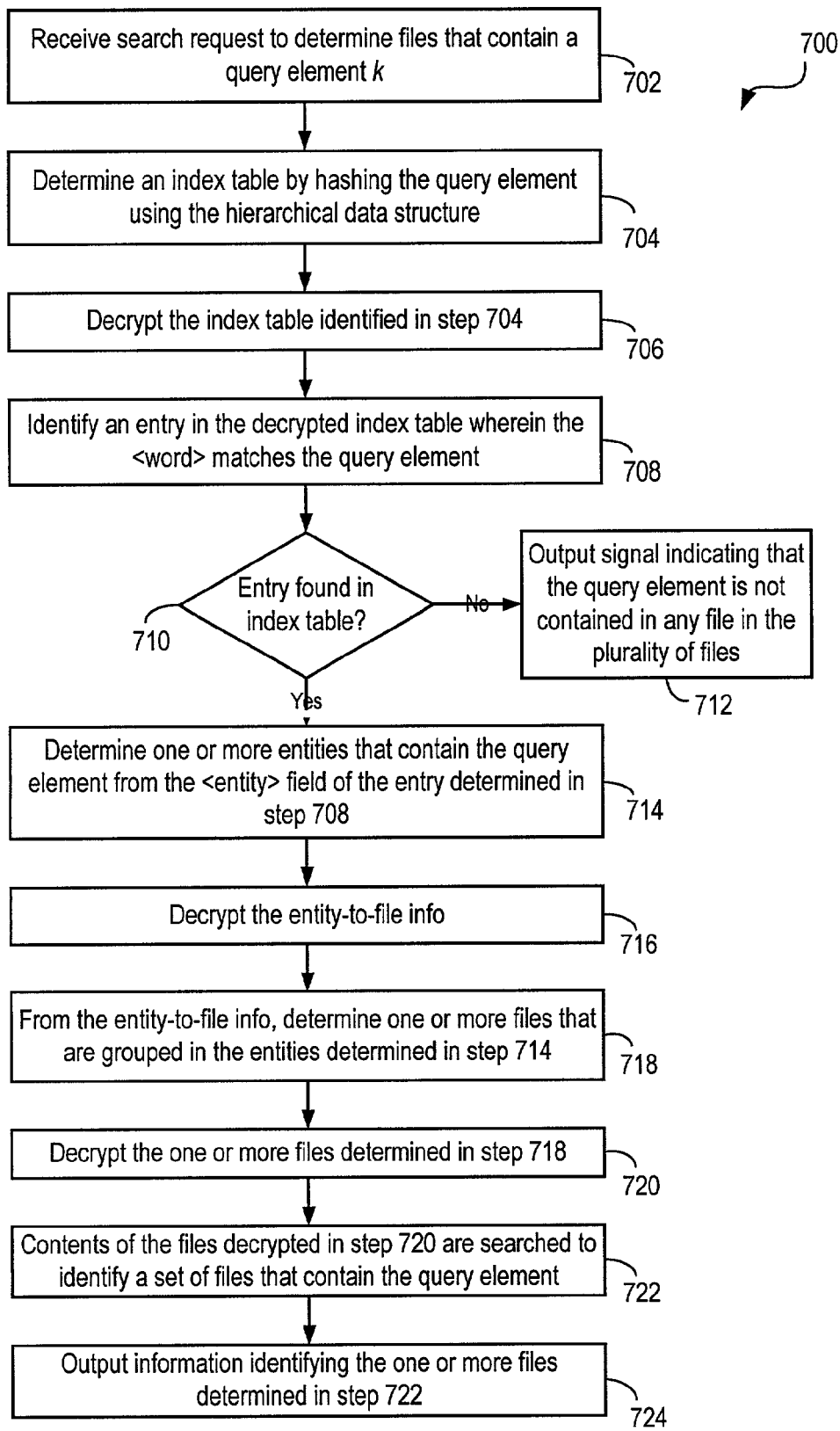
FIG. 7 is a high-level simplified flowchart of a method of searching encrypted searchable spaces according to an embodiment of the present invention applying the third search technique.

FIG. 7 is a simplified high-level flowchart 700 depicting a method of searching encrypted searchable spaces according to an embodiment of the present invention applying the third search technique. The method depicted in FIG. 7 may be performed by software modules executing on computer system 100, hardware modules coupled to computer system 100, or combinations thereof. In alternative embodiments, the processing may be performed by multiple computer systems. Flowchart 700 depicted in FIG. 7 is merely illustrative of an embodiment incorporating the present invention and does not limit the scope of the invention as recited in the claims. One of ordinary skill in the art would recognize variations, modifications, and alternatives.

As depicted in FIG. 7, processing is initiated when computer system 100 receives a search request to determine files in the plurality of encrypted files that contain a query element k (step 702). A user of computer system 100 using one or more input devices coupled to computer system 100 may configure the search request. Alternatively, the search request may be received from a process executing on computer system 100. The search request may also be received from devices or systems coupled to computer system 100. For example, in a network environment, the search request may be received by computer system 100 from another computer system coupled to computer system 100 via network interface 106.

The query element specified in the search request is then hashed using the hashing structure of the hierarchical data structure built according to the third search technique to determine an index table that stores a portion of the word-to-entity information (step 704). The processing performed in step 704 is described below in further detail. The index table determined in step 704 is then decrypted (step 706). The decrypted index table is then searched to identify an entry in the index table whose <word> matches the query element (step 708). If it is determined (step 710) that there is no entry in the index table whose <word> matches the query element, it indicates that the query element is not found in any file in the plurality of files. A signal is then output indicating that the query element is not contained in any file in the plurality of encrypted files (step 712).

If a matching entry is found in step 708, it indicates that at least one file in the plurality of files contains the query element. One or more entities that contain the query element are determined from the <entity> field of the matching index table entry determined in step 708 (step 714).

The entity-to-file information is then decrypted (step 716). According to an embodiment of the present invention, the entity-to-file information may be decrypted in step 706 when the index table storing the word-to-entity information is decrypted. According to an alternative embodiment of the present invention, step 716 might not be performed if the entity-to-file information is stored in non-encrypted plaintext form. According to an embodiment of the present invention, the entity-to-file information may also be spread across multiple tables with each table storing a portion of the entity-to-file information. In this embodiment, only that portion of the entity-to-file information corresponding to the index table decrypted in step 706 may be decrypted. This helps reduce the amount of information that has to be decrypted to process the search request.

The decrypted entity-to-file information is then used to determine one or more files that are grouped in the entities determined in step 714 (step 718). The files identified in step 718 are generally a subset of the plurality of files. For example, if M files are included in the plurality of files and Z files are identified in step 718, then Z is generally less than M.

The one or more files determined in step 718 are then decrypted (step 720). The contents of the files decrypted in step 720 are then searched to identify a set of one or more files that contain the query element (step 722). The set of files identified in step 722 includes files that may contain the query element. The files identified in step 722 may be a subset of the files identified in step 718. For example, if Z files are determined in step 718 and J files are identified in step 722, then $J \leq Z$. The location of the query element in the files may also be determined as part of step 722. Information identifying the one or more files determined in step 722 is then output to the user (step 724). As part of step 722, information identifying locations of the query element within the files may also be output.

Figure 8:
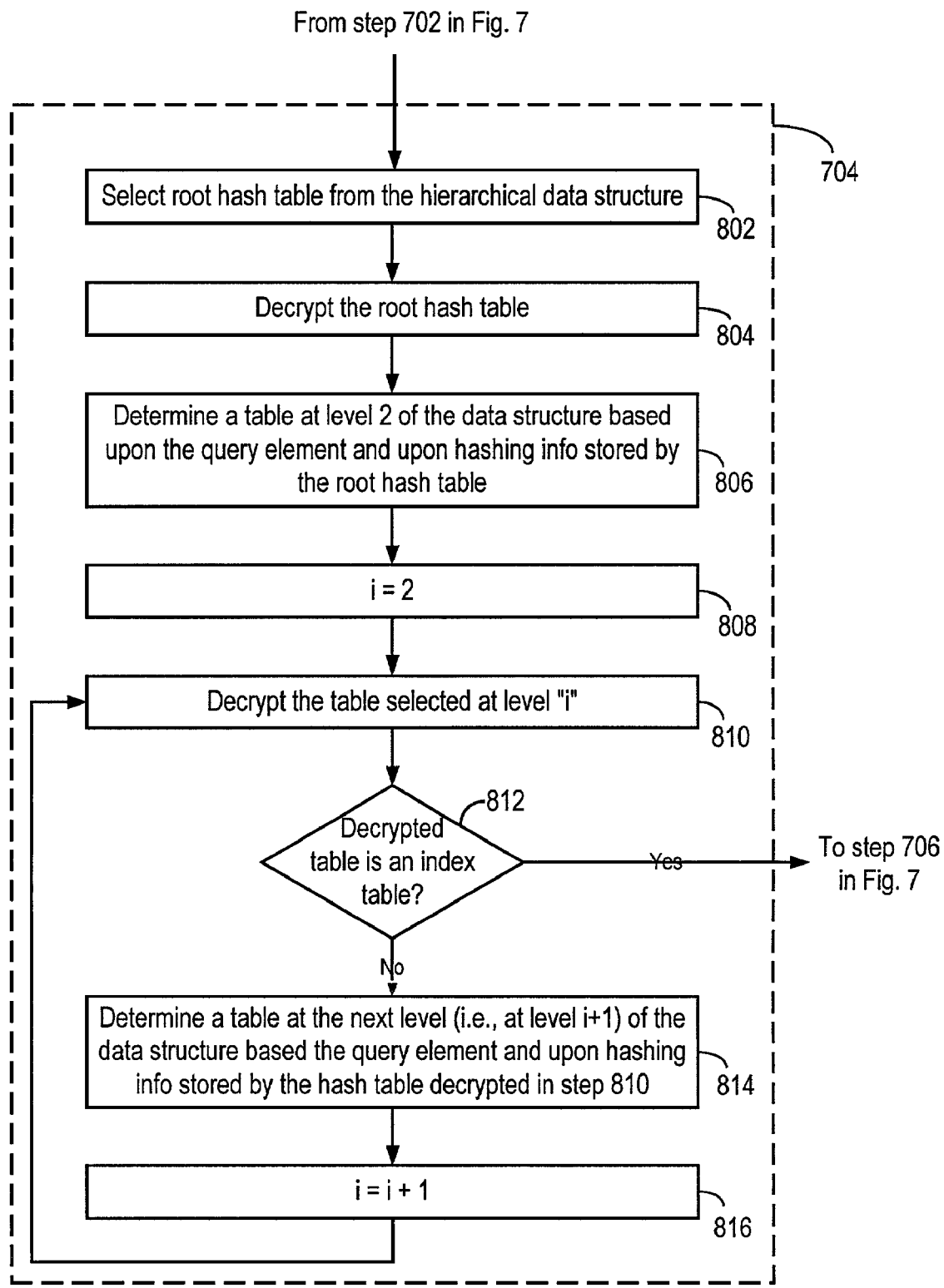
FIG. 8 is a high-level simplified flowchart depicting processing performed in step 704 of FIG. 7 according to an embodiment of the present invention applying the third search technique.

FIG. 8 is a high-level simplified flowchart depicting processing performed in step 704 of FIG. 7 according to an embodiment of the present invention applying the third search technique. The method depicted in FIG. 8 may be performed by software modules executing on computer system 100, hardware modules coupled to computer system 100, or combinations thereof. In alternative embodiments, the processing maybe performed by one or more computer systems. The method depicted in FIG. 8 is merely illustrative of an embodiment incorporating the present invention and does not limit the scope of the invention as recited in the claims. One of ordinary skill in the art would recognize variations, modifications, and alternatives.

As depicted in FIG. 8, upon receiving a search request, the root hash table of the hierarchical data structure generated according to the teachings of the third search technique is selected (step 802). The root hash table is then decrypted (step 804). A table at level 2 of the hierarchical data structure is then determined based upon the query element and upon hashing information stored by the root hash table (step 806). The table at level 2 is the <child table> corresponding to the <hash value> of the query element in the root table. A variable "i" is then initialized to 2 to indicate the level of the selected table (step 808). The table selected at level "i" is then decrypted (step 810). A check is then made to determine if the table decrypted in step 810 is a hash table or an index table (step 812). If the table is determined to be an index table, then processing continues with step 706 in FIG. 7. If the table is determined to be a hash table, then a table at the next level (i.e., at level (i+1)) of the hierarchical data structure is determined based upon the query element and hashing information stored by the hash table decrypted in step 810 (step 814). The table at level "i+1" corresponds to the <child table> corresponding to the <hash value> of the query element in the hash table at level "i". The value of variable "i" is then incremented to indicate the level of the selected table (step 816). Processing then continues with step 810.

Since the hash tables and the index tables are stored in encrypted form, multiple levels of hashing are used to minimize the amount of information that needs to be decrypted for processing a search request. The third search technique is thus well suited for search environments where the size of main memory (e.g., RAM) is smaller than the size of the index table of the second search technique since only a portion of the index table is decrypted to process the search request. This provides substantial savings in the time needed to process a search request while minimizing the memory resources required to perform the search.

Figure 9:
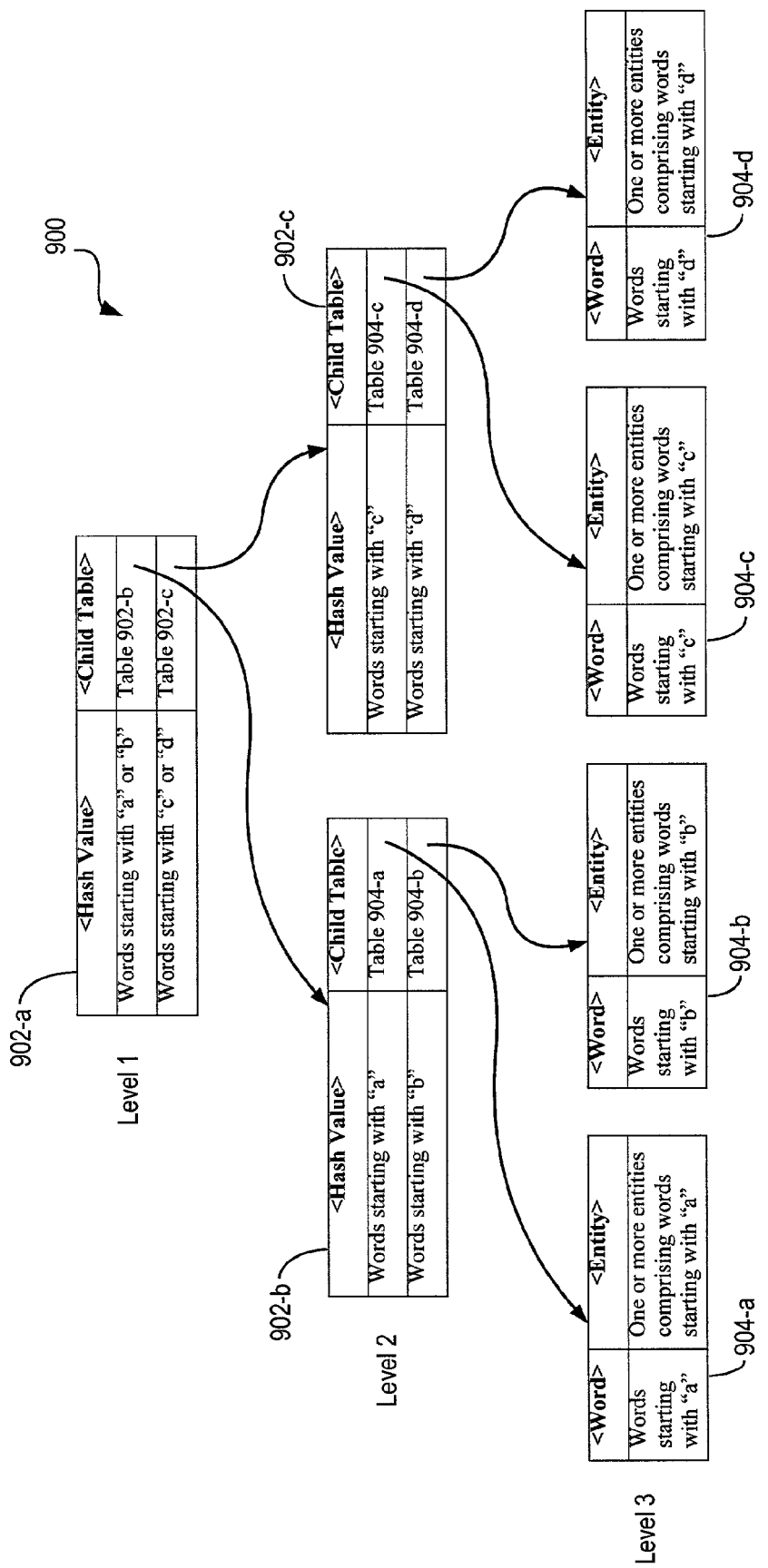
FIG. 9 depicts an example of a hierarchical data structure generated according to the teachings of the third search technique for a plurality of encrypted files according to an embodiment of the present invention.

FIG. 9 depicts an example of a hierarchical data structure 900 generated according to the teachings of the third search technique for a plurality of encrypted files containing elements (words) belonging to a domain Σ according to an embodiment of the present invention. It is assumed that the character set for the domain Σ comprises four characters, namely, "a", "b", "c", and "d".

As depicted in FIG. 9, data structure 900 comprises three levels with hash tables 902 at levels 1 and 2, and index tables 904 at level 3. Root hash table 902-a comprises two entries: (<Words starting with "a" or "b">, <Table 902-b>), and (<Words starting with "c" or "d">, <Table 902-c>). Accordingly, if a query element starts with "a" or "b", then table 902-b is selected, else if the query element starts with "c" or "d", then table 902-c is selected. Table 902-b at level 2 also has two entries: (<Words starting with "a">, <Table 904-*a*>), and (<Words starting with "b">, <Table 904-*b*>). Accordingly, if the query element starts with "a" then index table 904-*a* is selected, else if the query element starts with "b", then index table 904-*b* is selected. Table 902-*c* at level 2 also has two entries: (<Words starting with "c">, <Table 904-*c*>), and (<Words starting with "d">, <Table 904-*d*>). Accordingly, if the query element starts with "c" then index table 904-*c* is selected, else if the query element starts with "d", then index table 904-*d* is selected.

Each index table 904 stores a portion of the word-to-entity information. As depicted in FIG. 9, index table 904-*a* stores information related to words starting with "a" and the entities that contain the words, index table 904-*b* stores information related to words starting with "b" and the entities that contain the words, index table 904-*c* stores information related to words starting with "c" and the entities that contain the words, and index table 904-*d* stores information related to words starting with "d" and the entities that contain the words.

Accordingly, if the query element specified in a search request starts with the character "c", then only hash tables 902-*a* and 902-*c* and index table 904-*c* are decrypted as part of the processing to service the search request. Thus, only a portion of the hashing structure and a portion of the word-to-entity information is decrypted to process the search request. This provides substantial savings in the time needed to process a search request while minimizing the memory resources required to perform the search.

Figure 10:
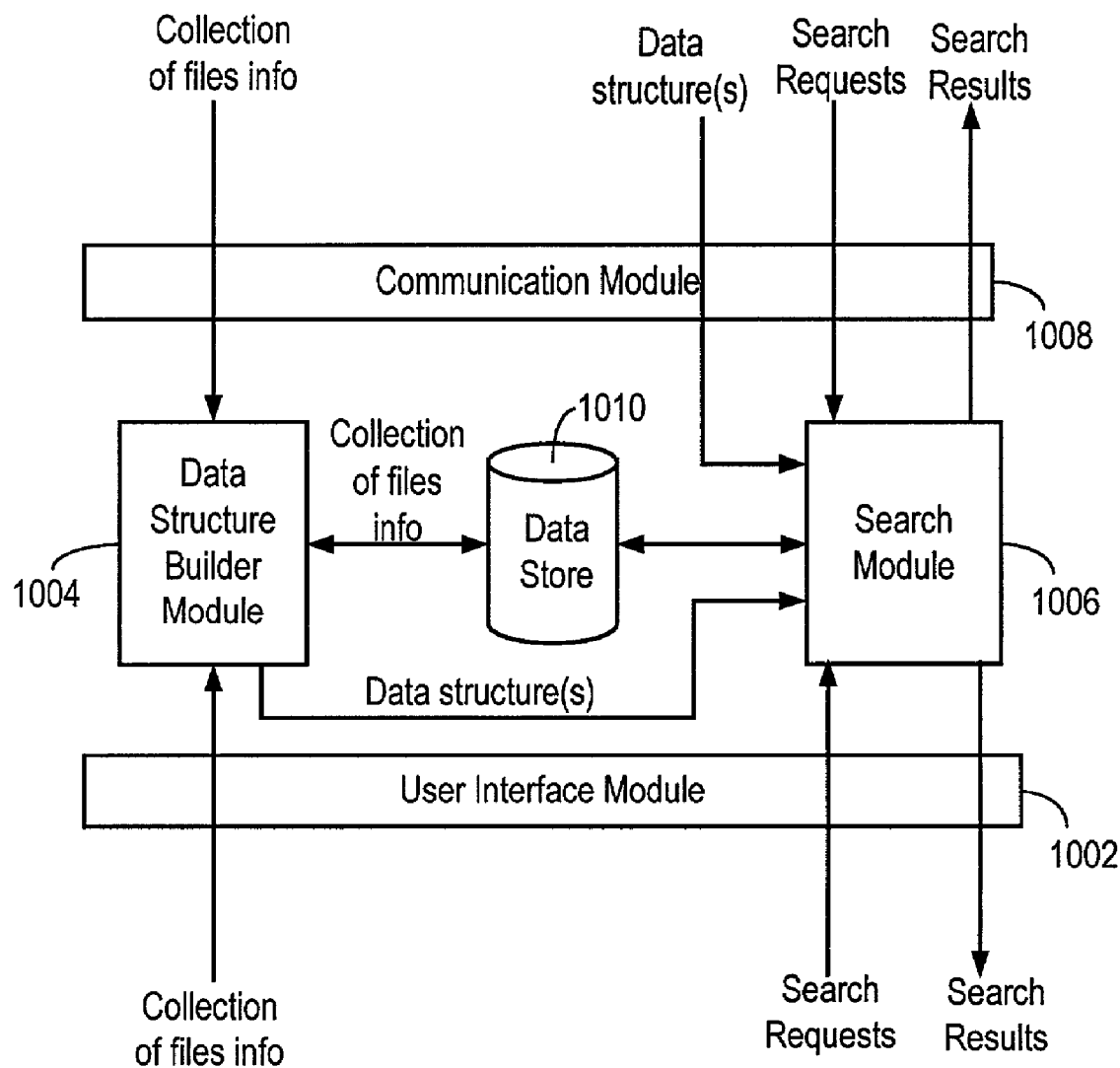
FIG. 10 is a simplified block diagram depicting various modules and/or engines that may be used to implement search techniques according to an embodiment of the present invention.

Examples of Modules for Implementing the Search Techniques According to Embodiments of the Present Invention FIG. 10 is a simplified block diagram depicting various modules and/or engines that might be used to implement the search techniques, including the first, second, and third search techniques described above, according to an embodiment of the present invention. The modules depicted in FIG. 10 may be implemented in software or hardware or combinations thereof. As shown in FIG. 10, the modules include a user interface (UI) module 1002, a data structure builder module 1004, a search module 1006, and a communication module 1008.

Data structure builder module 1004 is configured to build one or more data structures that are used to perform searches according to the teachings of the present invention. The data structure(s) may be built according to the first search technique, the second search technique, the third search technique, or other techniques. According to an embodiment of the present invention, the plurality of files to be searched may be stored in database 1010 and may be accessed by structure builder module 1004 to build the data structure(s). In a networked environment, the plurality of files may be stored by various computer systems in the network and data structure builder module 1004 may receive or access information related to the plurality of files from the various computer systems via communication module 1008. The user may also specify the plurality of files to be searched by providing the relevant filenames via user interface 1002. The data structure (s) built by data structure builder 1004 may be stored in a memory location accessible to the computer system that is configured to perform searches.

Search module 1006 is configured to perform searches to determine files from the plurality of files that contain at least one occurrence of a query element specified in a search request. Search module 1006 uses the data structure(s) built by data structure builder module 1004 to perform the searches. Search module 1006 may receive the search request via user interface module 1002. Searching may be performed according to the first search technique, the second search technique, the third search technique, or other techniques. Results of the searches performed by search module 1006 may be output to the user via user interface module 1002. In a networked environment, search module 1006 may receive search requests from other computer systems and networks via communication module 1008 and the search results may be communicated to the sources of the search requests via communication module 1008. In a network environment, search module 1006 may access the data structures used for the searching via communication module 1008. The data structures used by search module 1006 to perform the searches may also be received from an external computer or network via communication module 1008.

Communication module 1008 is configured to facilitate communication of information and data to and from the computer system that is configured to search encrypted searchable spaces according to the teachings of the present invention. Communication module 1008 may receive search requests from external entities including external computer systems and networks. Data structures used to facilitate the searches may also be received by communication module 1008 from external entities. Results of searches performed by search module 1006 may be communicated by communication module 1008 to the sources of the requests.

User interface module 1002 provides an interface via which a user may input search requests and receive results of the search requests. According to an embodiment of the present invention, a user may also provide information related to the plurality of files to be searched via interface module 1002.

Data store 1010 may serve as a repository for storing information related to processing performed by data structure builder module 1004 and search module 1006. For example, information related to the plurality of files and the data structure(s) used for the searches may be stored in data store 1010.

Technique for Improving Performance of the Search Techniques

The performance of the above-described search techniques may be further improved by providing a dedicated server for performing the search. In this embodiment, the plurality of files and the data structures used for the search are stored in encrypted form on a data store accessible to the dedicated server. According to the teachings of the present invention, as much as possible of the information needed for performing the searches, including contents of the plurality of files and data structures used for the searches, is stored in main memory (e.g., RAM) of the dedicated server in non-encrypted or plaintext form. The dedicated server is assumed to be safe and free from malicious attempts to read the main memory of the server.

In this embodiment, upon receiving a search request, the dedicated server first checks its main memory to determine if the information needed to service the search request is in the main memory of the dedicated server in non-encrypted form. The information needed to service the search request may include portions of the data structure used for performing the search (e.g., portions of the word-to-entity information, portions of the entity-to-file information, or the like), and the contents of the one or files identified from the data structure information that are to be searched. If the requisite information needed to perform the search resides in the main memory of the dedicated server in plaintext form, then that plaintext information is used to perform the search corresponding to the search request. Accordingly, in a scenario where the requisite information is located in the main memory of the dedicated server, the search can be performed without having to decrypt any information stored in the date store. Since no decryption is needed, the search is performed in a faster time than searches that require information to be decrypted. Any of the search techniques described above, including the first search technique, the second search technique, or the third search technique, may be used as the underlying search technique. If the requisite information needed to perform the search in not located in the main memory of the dedicated server, then the requisite information is read from the data store, decrypted, and then used for processing the search request.

Accordingly, as described above, the performance of a search technique can be improved if the information required for servicing a search request is located in the main memory of the search server in non-encrypted form. The main memory thus functions as a cache for storing the requisite information.

Various different techniques may be used to increase the probability that the requisite information is in the main memory of the dedicated server in non-encrypted form. According to one technique, contents of files from the plurality of files that are frequently accessed or frequently searched may be stored in the main memory of the dedicated server in non-encrypted form. According to another technique, contents of recently used or searched files from the plurality of files may be stored in the main memory of the dedicated server. Likewise, information stored by frequently used or recently used index tables and/or hash tables may also be stored in the main memory of the dedicated server. Several other techniques may also be used to increase the chance that the information needed for the search is in the main memory of the search server in non-encrypted form.

As described above, the present invention provides improved techniques for searching encrypted files (or encrypted searchable spaces) in an efficient manner while minimizing the memory resources required to perform the searches. The improvement is achieved by reducing the amount of information that has to be decrypted to perform the search. According to the teachings of the present invention, the number of files that need to be decrypted is normally less than the total number of files in the plurality of files to be searched. Likewise, according to an embodiment of the present invention, only a portion of the indexing information (e.g., only a portion of the word-to-entity information) is decrypted to perform the search. Efficiency is also obtained by using multiple levels of hashing (for example, hashing used by the third search technique).

For example, let assume that the search request requests determination of files in the plurality of files that contain a query element k comprising a plurality of words. Let p be the probability that a word w occurs in a file in the plurality of files. If there are M files in the plurality of files, then the expected number of files containing word w is Mp. If the query element contains q words, then assuming independence, the probability that all the words in the query element occur in a given file is $p^q$. Thus, the expected number of files containing all the words in the query element is $Mp^q$. For instance, if p is 1/5 and q is 5, then $Mp^q$ is only (1/625)Th of Mp. In other words, the number of files to be decrypted will be very small (possibly only one or two). As a result, only a very small number of files need to be decrypted to process the search request. The search request can be processed in an efficient manner.

It should be apparent that the above description describes only a specific embodiment of the present invention and does not limit the scope of the present invention as recited in the claims. Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware or only in software or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method of searching a plurality of encrypted files for which a data structure storing information related to contents of the plurality of encrypted files is provided, the method comprising:
    receiving information identifying a query element;
    determining a first set of files from the plurality of encrypted files wherein membership of the first set is based upon the query element and unencrypted information from the data structure, the first set of files comprising less than all of the plurality of encrypted files;
    decrypting each file in the first set of files;
    searching each decrypted file in the first set of files to identify a second set of files including files that contain the query element, wherein the search is performed using an unencrypted form of the query element, wherein the second set of files is a subset of the first set and identification is based on matching the unencrypted form of the query element with unencrypted data determined after the decrypting step, wherein the second set of files comprises a fewer set of files for at least one instance of the query element such that the first set of files can contain a document that does not contain the at least one instance of the query element; and
    outputting information identifying files in the second set of files, wherein the plurality of encrypted files are partitioned into entities according to a size parameter, each entity comprising portions of one or more files from the plurality of encrypted files, and at least one entity comprising portions of two or more files from the plurality of encrypted files.

2. The method of claim 1 wherein at least some of the data structure is encrypted and determining the first set of files from the plurality of encrypted files comprises:
    decrypting a portion of the data structure; and
    determining the membership of the first set of files based upon the decrypted portion of the data structure.

3. The method of claim 1 wherein:
    the data structure stores first mapping information mapping contents of the plurality of encrypted files to entities that contain the contents, and second mapping information mapping each entity to one or more files from the plurality of encrypted files whose portions are included in the entity, wherein the first mapping information is encrypted.

4. The method of claim 3 wherein the entities are of a first size and the first size is user configurable.

5. The method of claim 3 wherein each entity in the entities corresponds to a file in the plurality of encrypted files.

6. The method of claim 3 wherein determining the first set of files from the plurality of encrypted files comprises:
   decrypting first mapping information;
   determining, based upon the decrypted first mapping information, a set of entities that contain the query element; and
   determining the first set of files from the second mapping information, the first set of files including one or more files whose portions are included in the set of entities.

7. The method of claim 6 wherein the second mapping information is encrypted and determining the first set of files from the second mapping information comprises:
   decrypting the second mapping information; and
   determining the first set of files based upon the decrypted second mapping information.

8. The method of claim 1 wherein:
   the data structure stores hashing information and indexing information, the indexing information mapping contents of the plurality of encrypted files to entities that contain the contents, the hashing information hashing the query element to a portion of the indexing information, wherein the indexing information is encrypted.

9. The method of claim 8 wherein the entities are of a first size and the first size is user configurable.

10. The method of claim 8 wherein each entity in the entities corresponds to a file in the plurality of encrypted files.

11. The method of claim 8 wherein determining the first set of files from the plurality of encrypted files comprises:
    determining, based upon the hashing information, a portion of the indexing information for the query element;
    decrypting the portion of the indexing information;
    determining, from the decrypted portion of the indexing information, a set of entities that contain the query element;
    accessing mapping information that maps each entity to one or more files from the plurality of encrypted files whose portions are included in the entity; and
    determining the first set of files from the mapping information, the first set of files including one or more files whose portions are included in the set of entities.

12. The method of claim 11 wherein the mapping information is encrypted and determining the first set of files from the mapping information comprises:
    decrypting the mapping information; and
    determining the first set of files based upon the decrypted mapping information.

13. The method of claim 1 wherein files included in the first set of files are also included in the second set of files.

14. The method of claim 1 wherein the data structure is stored on a computer readable storage medium.

15. The method of claim 1 wherein the data structure is stored in random access memory (RAM).

16. A computer program product stored on a computer readable storage medium for searching a plurality of encrypted files for which a data structure storing information related to contents of the plurality of encrypted files is provided, the computer program product comprising:
    code for receiving information identifying a query element;
    code for determining a first set of files from the plurality of encrypted files wherein membership of the first set is based upon the query element and unencrypted information in the data structure, the first set of files comprising less than all of the plurality of encrypted files;
    code for decrypting each file in the first set of files;
    code for searching each decrypted file in the first set of files to identify a second set of files including files that contain the query element, wherein the search is performed using an unencrypted form of the query element, wherein the second set of files is a subset of the first set, wherein the second set of files comprises a fewer set of files for at least one instance of the query element such that the first set of files can contain a document that does not contain the at least one instance of the query element; and
    code for outputting information identifying files in the second set of files, wherein the plurality of encrypted files are partitioned into entities according to a size parameter, each entity comprising portions of one or more files from the plurality of encrypted files, and at least one entity comprising portions of two or more files from the plurality of encrypted files.

17. The computer program product of claim 16 wherein at least some of the data structure is encrypted and the code for determining the first set of files from the plurality of encrypted files comprises:
    code for decrypting a portion of the data structure; and
    code for determining the membership of the first set of files based upon the decrypted portion of the data structure.

18. The computer program product of claim 16 wherein:
    the data structure stores first mapping information mapping contents of the plurality of encrypted files to entities that contain the contents, and second mapping information mapping each entity to one or more files from the plurality of encrypted files whose portions are included in the entity, wherein the first mapping information is encrypted.

19. The computer program product of claim 18 wherein the entities are of a first size and the first size is user configurable.

20. The computer program product of claim 18 wherein each entity in the entities corresponds to a file in the plurality of encrypted files.

21. The computer program product of claim 18 wherein the code for determining the first set of files from the plurality of encrypted files comprises:
    code for decrypting first mapping information;
    code for determining, based upon the decrypted first mapping information, a set of entities that contain the query element; and
    code for determining the first set of files from the second mapping information, the first set of files including one or more files whose portions are included in the set of entities.

22. The computer program product of claim 21 wherein the second mapping information is encrypted and the code for determining the first set of files from the second mapping information comprises:
    code for decrypting the second mapping information; and
    code for determining the first set of files based upon the decrypted second mapping information.

23. The computer program product of claim 16 wherein:
    the data structure stores hashing information and indexing information, the indexing information mapping contents of the plurality of encrypted files to entities that contain the contents, the hashing information hashing the query element to a portion of the indexing information, wherein the indexing information is encrypted.

24. The computer program product of claim 23 wherein the entities are of a first size and the first size is user configurable.

25. The computer program product of claim 23 wherein each entity in the entities corresponds to a file in the plurality of encrypted files.

26. The computer program product of claim 23 wherein the code for determining the first set of files from the plurality of encrypted files comprises:
  code for determining, based upon the hashing information, a portion of the indexing information for the query element;
  code for decrypting the portion of the indexing information;
  code for determining, from the decrypted portion of the indexing information, a set of entities that contain the query element;
  code for accessing mapping information that maps each entity to one or more files from the plurality of encrypted files whose portions are included in the entity; and
  code for determining the first set of files from the mapping information, the first set of files including one or more files whose portions are included in the set of entities.

27. The computer program product of claim 26 wherein the mapping information is encrypted and the code for determining the first set of files from the mapping information comprises:
  code for decrypting the mapping information; and
  code for determining the first set of files based upon the decrypted mapping information.

28. The computer program product of claim 16 wherein files included in the first set of files are also included in the second set of files.

29. A system for searching a plurality of encrypted files for which a data structure storing information related to contents of the plurality of encrypted files is provided, the system comprising:
  a processor; and
  a memory coupled to the processor, wherein the memory is configured to store a plurality of code modules for execution by the processor, the plurality of code modules comprising:
    a code module for receiving information identifying a query element;
    a code module for determining a first set of files from the plurality of encrypted files wherein membership of the first set is based upon the query element and unencrypted information in the data structure, the first set of files comprising less than all of the plurality of encrypted files;
    a code module for decrypting each file in the first set of files;
    a code module for searching each decrypted file in the first set of files to identify a second set of files including files that contain the query element, wherein the search is performed using an unencrypted form of the query element, wherein the second set of files is a subset of the first set and identification is based on matching the unencrypted query element with unencrypted data, wherein the second set of files comprises a fewer set of files for at least one instance of the query element such that the first set of files can contain a document that does not contain the at least one instance of the query element; and
    a code module for outputting information identifying files in the second set of files, wherein the plurality of encrypted files are partitioned into entities according to a size parameter, each entity comprising portions of one or more files from the plurality of encrypted files, and at least one entity comprising portions of two or more files from the plurality of encrypted files.

30. The system of claim 29 wherein at least some of the data structure is encrypted and the code module for determining the first set of files from the plurality of encrypted files comprises:
  a code module for decrypting a portion of the data structure; and
  a code module for determining the membership of the first set of files based upon the decrypted portion of the data structure.

31. The system of claim 29 wherein:
  the data structure stores first mapping information mapping contents of the plurality of encrypted files to entities that contain the contents, and second mapping information mapping each entity to one or more files from the plurality of encrypted files whose portions are included in the entity, wherein the first mapping information is encrypted.

32. The system of claim 31 wherein the entities are of a first size and the first size is user configurable.

33. The system of claim 31 wherein each entity in the entities corresponds to a file in the plurality of encrypted files.

34. The system of claim 31 wherein the code module for determining the first set of files from the plurality of encrypted files comprises:
  a code module for decrypting first mapping information;
  a code module for determining, based upon the decrypted first mapping information, a set of entities that contain the query element; and
  a code module for determining the first set of files from the second mapping information, the first set of files including one or more files whose portions are included in the set of entities.

35. The system of claim 34 wherein the second mapping information is encrypted and the code module for determining the first set of files from the second mapping information comprises:
  a code module for decrypting the second mapping information; and
  a code module for determining the first set of files based upon the decrypted second mapping information.

36. The system of claim 29 wherein:
  the data structure stores hashing information and indexing information, the indexing information mapping contents of the plurality of encrypted files to entities that contain the contents, the hashing information hashing the query element to a portion of the indexing information, wherein the indexing information is encrypted.

37. The system of claim 36 wherein the entities are of a first size and the first size is user configurable.

38. The system of claim 36 wherein each entity in the entities-corresponds to a file in the plurality of encrypted files.

39. The system of claim 36 wherein the code module for determining the first set of files from the plurality of encrypted files comprises:
  a code module for determining, based upon the hashing information, a portion of the indexing information for the query element;
  a code module for decrypting the portion of the indexing information;
  a code module for determining, from the decrypted portion of the indexing information, a set of entities that contain the query element;
  a code module for accessing mapping information that maps each entity to one or more files from the plurality of encrypted files whose portions are included in the entity; and a code module for determining the first set of files from the mapping information, the first set of files including one or more files whose portions are included in the set of entities.

40. The system of claim 39 wherein the mapping information is encrypted and the code module for determining the first set of files from the mapping information comprises:

a code module for decrypting the mapping information; and a code module for determining the first set of files based upon the decrypted mapping information.

41. The system of claim 29 wherein files included in the first set of files are also included in the second set of files.

42. The system of claim 29 wherein the data structure is stored in random access memory (RAM).

43. A system for searching a plurality of encrypted files for which a data structure storing information related to contents of the plurality of encrypted files is provided, the system comprising:

means for receiving information identifying a query element;

means for determining a first set of files from the plurality of encrypted files wherein membership of the first set is based upon the query element and information in the data structure, the first set of files comprising less than all of the plurality of encrypted files;

means for decrypting each file in the first set of files;

means for searching each decrypted file in the first set of files to identify a second set of files including files that contain the query element, wherein the search is performed using an unencrypted form of the query element, wherein the second set of files is a subset of the first set, wherein the second set of files comprises a fewer set of files for at least one instance of the query element such that the first set of files can contain a document that does not contain the at least one instance of the query element; and means for outputting information identifying files in the second set of files, wherein the plurality of encrypted files are partitioned into entities according to a size parameter, each entity comprising portions of one or more files from the plurality of encrypted files, and at least one entity comprising portions of two or more files from the plurality of files.

* * * * *